(12) United States Patent
Saito

(10) Patent No.: US 12,406,344 B2
(45) Date of Patent: Sep. 2, 2025

(54) IMAGE PROCESSING SYSTEM, IMAGE PROCESSING METHOD, AND STORAGE MEDIUM

(71) Applicant: CANON KABUSHIKI KAISHA, Tokyo (JP)

(72) Inventor: Tadanori Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 17/942,284

(22) Filed: Sep. 12, 2022

(65) Prior Publication Data

US 2023/0100099 A1    Mar. 30, 2023

(30) Foreign Application Priority Data

Sep. 24, 2021   (JP) .................. 2021-155137

(51) Int. Cl.
*G06T 5/80* (2024.01)
*G06T 5/50* (2006.01)
(Continued)

(52) U.S. Cl.
CPC .................. *G06T 5/80* (2024.01); *G06T 5/50* (2013.01); *G06V 20/56* (2022.01); *H04N 23/80* (2023.01);
(Continued)

(58) Field of Classification Search
CPC ......... G06T 5/80; G06T 5/50; G06T 2200/24; G06T 2207/20092; G06T 2207/20212;
(Continued)

(56) References Cited

U.S. PATENT DOCUMENTS 9,811,742 B2    11/2017 Ogata
12,256,178 B2 *  3/2025 Fujimori ................ H04N 7/188
(Continued)

FOREIGN PATENT DOCUMENTS

JP    2004-272578 A    9/2004
JP    2004-345554 A    12/2004
(Continued)

OTHER PUBLICATIONS

Sep. 5, 2023 Japanese Official Action in Japanese Patent Appln. No. 2021-155137.

*Primary Examiner* — Charles T Shedrick
(74) *Attorney, Agent, or Firm* — Venable LLP

(57) ABSTRACT

An image processing system includes an image acquisition unit configured to acquire an image signal generated by an imaging device that captures an optical image having a low-distortion region and a high-distortion region, a setting unit configured to set a distortion-correction region on which distortion-correction is performed for the image signal and a non-distortion-correction region on which distortion-correction is not performed for the image signal on the basis of characteristics of the optical image; and a display signal generation unit configured to perform distortion-correction for the image signal of the distortion-correction region on the basis of the characteristics of the optical image, and generate a synthesized image by synthesizing the image signal on which distortion-correction has been performed and the image signal of the non-distortion-correction region.

13 Claims, 13 Drawing Sheets

(51) Int. Cl.
  *G06V 20/56* (2022.01)
  *H04N 23/698* (2023.01)
  *H04N 23/80* (2023.01)
  *H04N 23/90* (2023.01)
(52) U.S. Cl.
  CPC  *G06T 2200/24* (2013.01); *G06T 2207/20092* (2013.01); *G06T 2207/20212* (2013.01); *G06T 2207/30252* (2013.01); *H04N 23/698* (2023.01); *H04N 23/90* (2023.01)
(58) Field of Classification Search
  CPC ........... G06T 2207/30252; G06T 2207/20012; G06V 20/56; G06V 10/147; H04N 23/80; H04N 23/698; H04N 23/90; H04N 25/61
  See application file for complete search history.

(56) References Cited

U.S. PATENT DOCUMENTS

| | | | |
|---|---|---|---|
| 2010/0002070 A1* | 1/2010 | Ahiska | .................. H04N 7/181 348/E7.001 |
| 2010/0002071 A1* | 1/2010 | Ahiska | .................. G06V 20/52 348/240.99 |
| 2015/0109446 A1* | 4/2015 | Takano | .................. B60R 25/10 348/148 |
| 2016/0090044 A1* | 3/2016 | Watanabe | ............... B60R 1/006 348/148 |
| 2016/0364619 A1 | 12/2016 | Ogata | |
| 2019/0012766 A1* | 1/2019 | Yoshimi | ............... G02B 27/64 |
| 2021/0110188 A1 | 4/2021 | Otsubo | |

FOREIGN PATENT DOCUMENTS

| | | |
|---|---|---|
| JP | 2010-095202 A | 4/2010 |
| JP | 2015-132879 A | 7/2015 |
| JP | 2020-014067 A | 1/2020 |
| WO | 2013/008623 A1 | 1/2013 |
| WO | WO-2016104842 A1 * 6/2016 ........... G06K 9/3233 |

\* cited by examiner

IMAGE PROCESSING SYSTEM, IMAGE PROCESSING METHOD, AND STORAGE MEDIUM

BACKGROUND OF THE INVENTION

Field of the Invention

The present invention relates to an image processing system capable of correcting distortion, an image processing method, and a storage medium.

Description of the Related Art

In recent years, there has been a demand to replace a rearview mirror mounted on a vehicle with an electronic rearview mirror. For example, Japanese Patent Laid-Open No. 2010-95202 discloses an electronic rearview mirror system constituted by an imaging unit configured to have an imaging range to the rear of and outside a vehicle and a display unit in the vehicle, and configured to allow a driver to check a state to the rear of and outside the vehicle by displaying an image captured by the imaging unit on a display inside the vehicle.

On the other hand, there is a rearward checking system that allows a driver to check a blind area behind a vehicle when the vehicle moves backward. Japanese Patent Laid-Open No. 2004-345554 discloses a rearward checking system for allowing a driver to check a blind area behind a vehicle at the time of moving backward by installing a camera to image to the rear of the vehicle and displaying the captured image in an interior of the vehicle.

A camera as the imaging unit for capturing an image for the above-described electronic rearview mirror is required to have a high-resolution for allowing a driver to check a state of a relatively distant place to the rear more finely. On the other hand, a rearward checking camera system is required to capture a wider range to confirm safety in a wider range including a blind area behind the vehicle and a rear lateral side to avoid a collision at the time of moving backward or the like.

Also, when an electronic rearview mirror system and a rearward checking system are mounted on a vehicle at the same time, if a camera for the electronic rearview mirror system and a camera for the rearward checking system are separately mounted, an in-vehicle image processing system becomes complicated. Such a problem also occurs in, for example, an automatic driving system in which a plurality of cameras is disposed to image a state around the vehicle to perform automatic driving or the like.

On the other hand, the number of cameras installed in a vehicle can be reduced by employing, for example, a camera that uses a special ultra-wide-angle lens. However, if an ultra-wide-angle lens or the like is used, although a wide angle of view can be obtained, distortion in the peripheral portion is large, and it is difficult to recognize an object in the peripheral portion unless the distortion is corrected. On the other hand, a delay time is incurred if the screen is displayed after the distortion is corrected, causing a delay in image recognition or visual recognition of an obstacle or the like, and this may cause a danger.

In view of the above-described problems, one objective of the present invention is to provide an image processing system suitable for early recognition of an obstacle or the like.

SUMMARY OF THE INVENTION

In order to achieve the above-described objective, an image processing system relating to one aspect of the present invention includes at least one processor or circuit configured to function as:
an image acquisition unit configured to acquire an image signal generated by an imaging device that captures an optical image having a low-distortion region and a high-distortion region;
a setting unit configured to set a distortion-correction region on which distortion-correction is performed for the image signal and a non-distortion-correction region on which distortion-correction is not performed for the image signal on the basis of characteristics of the optical image; and
a display signal generation unit configured to perform distortion-correction for the image signal of the distortion-correction region on the basis of the characteristics of the optical image, and generate a synthesized image by synthesizing the image signal on which distortion-correction has been performed and the image signal of the non-distortion-correction region.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
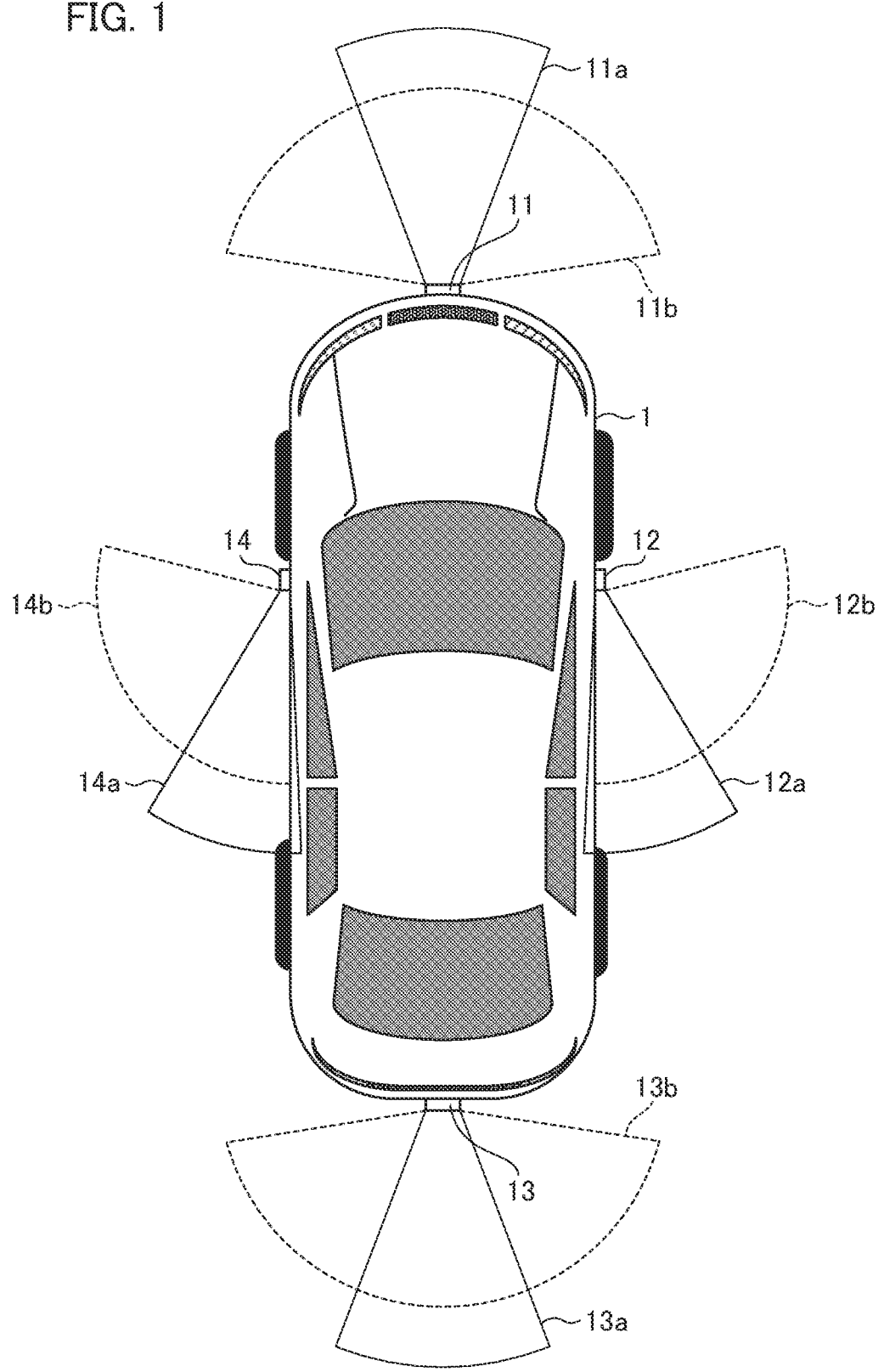
FIG. 1 is a view illustrating a positional relationship between a vehicle and an imaging unit in an image processing system of a first embodiment.

In a first embodiment, an improved method in which a high-definition display for an electronic rearview mirror and a display for checking surroundings of a vehicle such as a wide range of the rear are achieved at the same time with a small number of cameras will be described. FIG. 1 is a view illustrating a positional relationship between a vehicle and imaging units in an image processing system of the first embodiment.

In the first embodiment, as illustrated in FIG. 1, camera units 11, 12, 13, and 14 are installed on a front side, a right side, a rear side, and a left side of, for example, a vehicle 1 which is an automobile as a mobile object. Further, four camera units are used in the first embodiment, but the number of camera units is not limited to four, and may be at least one or more camera units.

The camera units 11 to 14 are installed to have an imaging range covering in front of, a right side of, a left side of, and to the rear of the vehicle 1 as the mobile object.

The camera units 11 to 14 have substantially the same configuration as each other, and each have an imaging element capturing an optical image, and an optical system configured to form an optical image on a light receiving surface of the imaging element. Further, for example, optical axes of the optical systems of the camera units 11 and 13 are installed to be substantially horizontal, and optical axes of the optical systems of the camera units 12 and 14 are installed to face slightly downward from the horizontal.

Also, the optical systems of the camera units 11 to 14 used in the first embodiment are each configured so that a high-definition image can be obtained at a narrow angle of view around the optical axis, and a low-resolution captured image can be obtained in a wide angle of view. Further, reference signs 11a to 14a denote imaging angles of view in which a high-resolution and low-distortion image can be captured, and reference signs 11b to 14b denote imaging angles of view in which a low-resolution and high-distortion image can be captured.

The optical systems of the camera units 11 to 14 in the first embodiment will be described with reference to FIG. 2. Further, characteristics of the optical systems of the camera units 11 to 14 do not have to be the same, but in the first embodiment, it is assumed that the optical systems of the camera units 11 to 14 have substantially the same characteristics, and an optical system of the camera unit 11 will be described as an example.

Figure 2A:
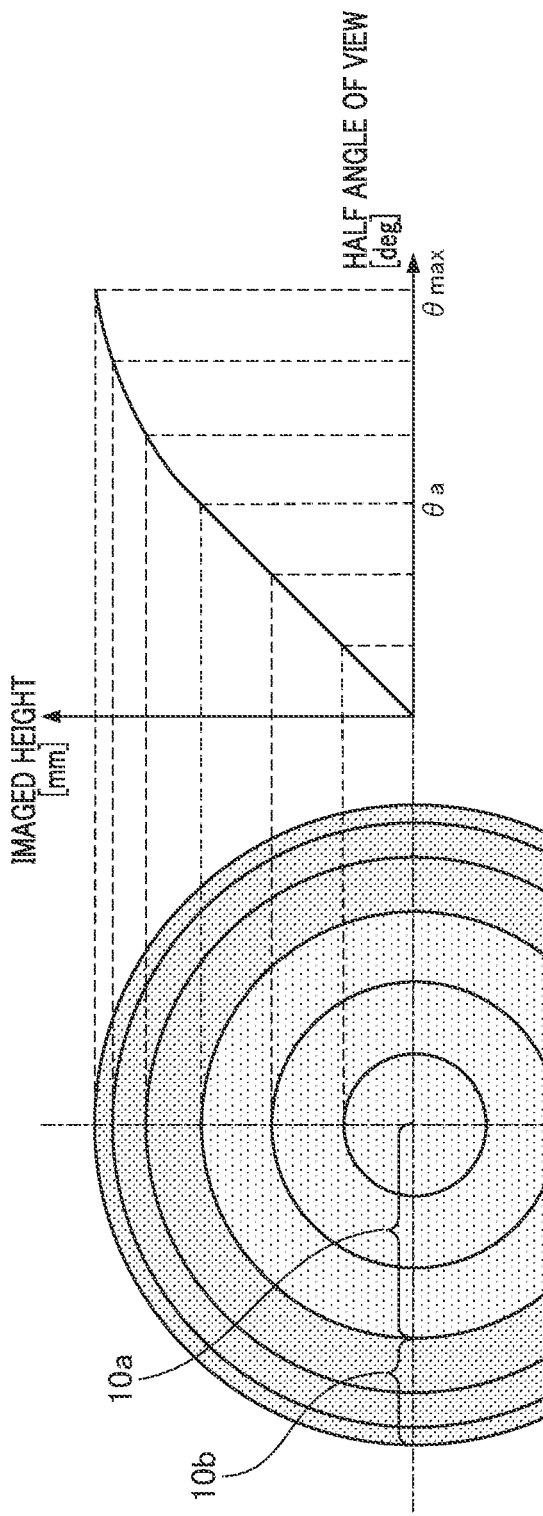
FIGS. 2A and 2B are diagrams for explaining optical characteristics of the imaging unit of the first embodiment.
Figure 2B:
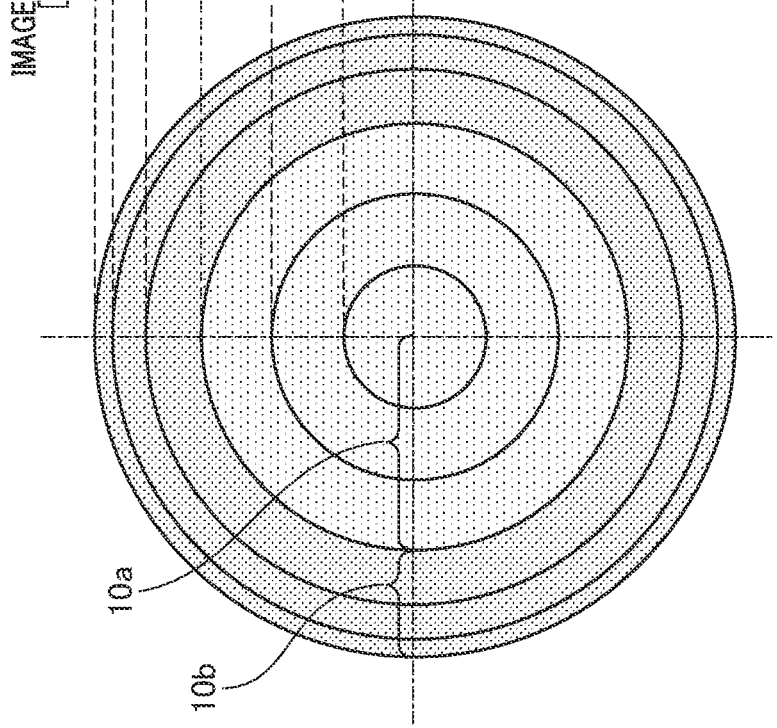

FIGS. 2A and 2B are diagrams for explaining optical characteristics of the imaging unit in the first embodiment of the present invention, and FIG. 2A is a diagram in which an imaged height y at each half angle of view on a light receiving surface of the imaging element in the optical system of the camera unit 11 in the first embodiment is shown in a contour line.

FIG. 2B is a diagram showing a projection characteristic representing a relationship between the imaged height y and a half angle of view θ of the optical system of the camera unit 11 in the first embodiment. In FIG. 2B, the half angle of view (angle formed by an optical axis and incident light) θ is taken as a horizontal axis, and an image forming height (imaged height) y on a sensor surface (imaging plane) of the camera unit 11 is taken as a vertical axis.

As shown in FIG. 2B, the optical system of the camera unit 11 in the first embodiment is configured so that a projection characteristic y(θ) differs between a region having a half angle of view less than a predetermined half angle of view θa and a region having a half angle of view equal to or greater than the half angle of view θa. Therefore, when an amount of increase in the imaged height y with respect to the half angle of view θ per unit is referred to as a resolution, the resolution differs depending on regions.

It can be said that this local resolution is expressed by a differential value dy(θ)/dθ of the projection characteristic y(θ) with respect to the half angle of view θ. That is, it can be said that the resolution becomes higher as an inclination of the projection characteristic y(θ) in FIG. 2B becomes larger. Also, it can also be said that the resolution becomes higher as a distance between the imaged heights y at the contour line-shaped half angle of view in FIG. 2A becomes larger.

In the first embodiment, a region close to a center formed on the sensor surface when the half angle of view θ is less than the predetermined half angle of view θa is called a high-resolution region 10a, and an outer region when the half angle of view θ is equal to or greater than the predetermined half angle of view θa is called a low-resolution region 10b. Further, the high-resolution region 10a corresponds to the imaging angle of view 11a, and the low-resolution region 10b corresponds to the imaging angle of view 11b.

Further, in the first embodiment, a circle at a boundary between the high-resolution region 10a and the low-resolution region 10b is called a resolution boundary, and a boundary image on a display screen corresponding to the resolution boundary is called a display resolution boundary or simply a boundary image. Further, the boundary image (display resolution boundary) displayed on the display screen may not be circular. It may be rectangular or the like for convenience.

Further, in the first embodiment, the high-resolution region 10a is a low-distortion region with a relatively small distortion, and the low-resolution region 10b is a high-distortion region with a relatively large distortion. Therefore, in the first embodiment, the high-resolution region and the low-resolution region correspond to the low-distortion region and the high-distortion region, and the high-resolution region and the low-resolution region may be referred to as the low-distortion region and the high-distortion region. Also, conversely, the low-distortion region and the high-distortion region may be referred to as the high-resolution region and the low-resolution region.

The optical system of the camera unit 11 in the first embodiment is configured so that the projection characteristic y(θ) thereof is larger than f×θ in the high-resolution region (low-distortion region) 10a (f is afocal length of the optical system of the camera unit 11). Also, the projection characteristic y(θ) in the high-resolution region (low-distortion region) is set to be different from the projection characteristic in the low-resolution region (high-distortion region).

Also, when θmax is a maximum half angle of view of the optical system of the camera unit 11, a ratio θa/θmax of θa and θmax is preferably a predetermined lower limit value or higher and, for example, 0.15 to 0.16 is preferable as the predetermined lower limit value.

Also, the ratio θa/θmax of θa to θmax is preferably a predetermined upper limit value or lower and is preferably, for example, 0.25 to 0.35. For example, if θmax is 90°, the predetermined lower limit value is 0.15, and the predetermined upper limit value is 0.35, it is desirable to determine 6a in a range of 13.5 to 31.5°.

Further, the optical system of the camera unit 11 is configured so that the projection characteristic y(θ) thereof satisfies the following equation 1.

$$1 < \frac{f \times \sin\theta_{max}}{y(\theta_{max})} \leq A \quad \text{(equation 1)}$$

f is the focal length of the optical system of the camera unit 11 as described above, and A is a predetermined constant. When the lower limit value is set to 1, a center resolution can be made higher than that of a fisheye lens of an orthographic projection method (y=f×sin θ) having the same maximum imaged height, and when the upper limit value is set to A, satisfactory optical performance can be maintained while obtaining an angle of view equivalent to that of the fisheye lens. The predetermined constant A may be determined in consideration of a balance between resolutions of the high-resolution region and the low-resolution region, and is preferably 1.4 to 1.9.

With the optical system configured as described above, an amount of increase in the imaged height y with respect to the half angle of view θ per unit is reduced in the low-resolution region 10b while a high-resolution can be obtained in the high-resolution region 10a, and thus a wider angle of view can be captured. Therefore, a high-resolution can be obtained in the high-resolution region 10a while having a wide angle of view equivalent to that of the fisheye lens as the imaging range.

Further, in the first embodiment, since the high-resolution region (low-distortion region) has a characteristic similar to that of a central projection method (y=f×tan θ) or an equidistant projection method (y=f×θ) having a projection characteristic of a normal optical system for imaging, an optical distortion is small and display can be made finely in the high-resolution region (low-distortion region). Therefore, a natural perspective can be obtained when visually observing surrounding vehicles or the like such as a preceding vehicle or a following vehicle, and satisfactory visibility can be obtained by suppressing deterioration of image quality.

Further, since the same effects can be obtained as long as the projection characteristic y(θ) satisfies the above-described equation (1), the present invention is not limited to the projection characteristic shown in FIG. 2. Further, in the first embodiment, the optical system having the projection characteristic y(θ) satisfying the above-described equation (1) may be referred to as a different-angle-of-view lens.

Further, the high-resolution regions 10a of the optical systems of the camera units 11 to 14 correspond to the imaging angles of view 11a to 14a, and the low-resolution regions 10b thereof correspond to the imaging angles of view 11b to 14b.

Figure 3:
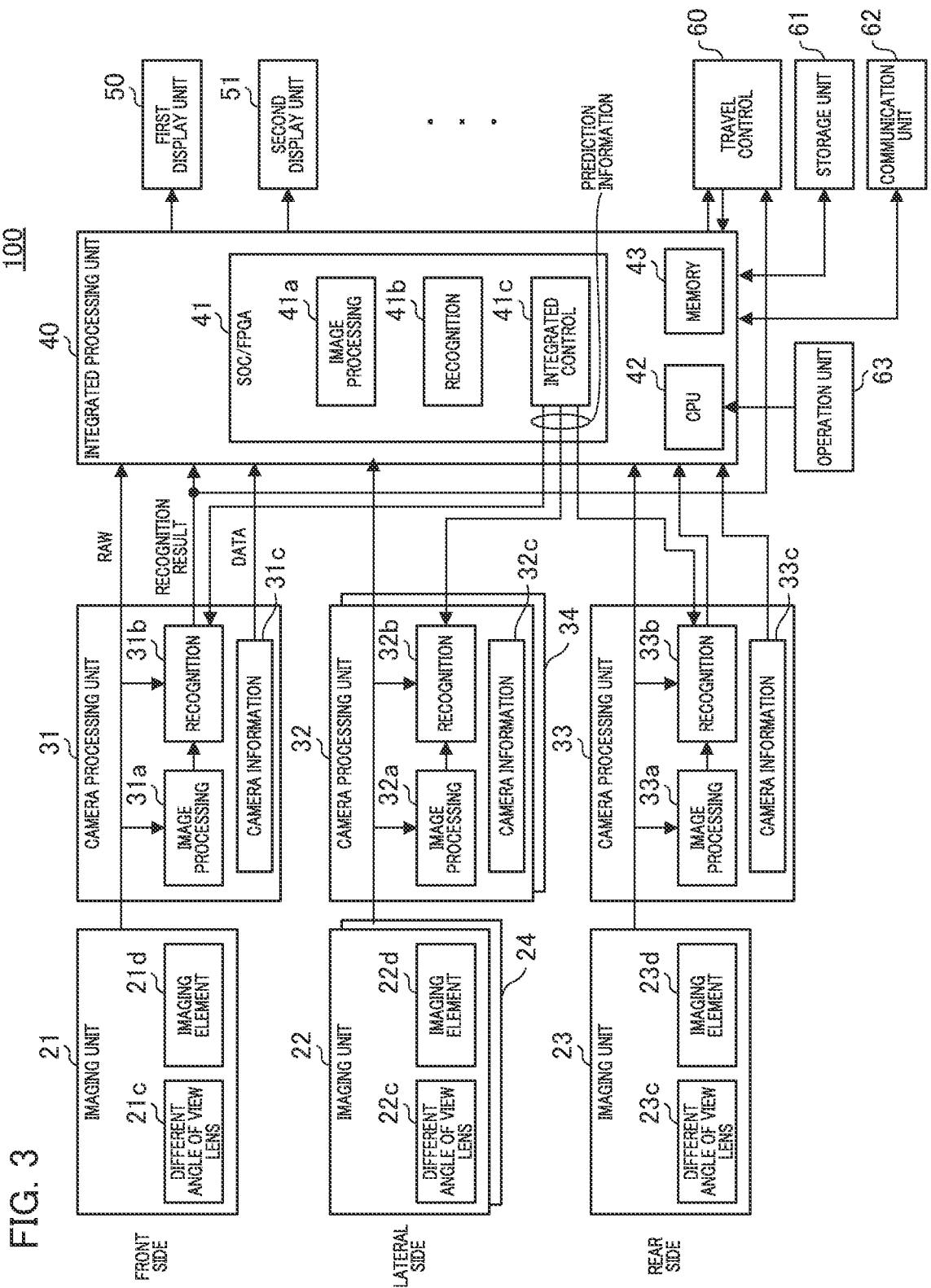
FIG. 3 is a functional block diagram for explaining a configuration of the image processing system of the first embodiment.

Next, a configuration of the image processing system in the first embodiment will be described with reference to FIG. 3. FIG. 3 is a functional block diagram for explaining a configuration of the image processing system of the first embodiment.

In FIG. 3, an image processing system 100 is mounted on the vehicle 1 as the mobile object, and imaging units 21 to 24 and camera processing units 31 to 34 are disposed in housings of the camera units 11 to 14.

The imaging units 21 to 24 include different-angle-of-view lenses 21c to 24c and imaging elements 21d to 24d such as CMOS image sensors or CCD image sensors. Here, the imaging units 21 to 24 function as image acquisition units, and the image acquisition units each acquires an image signal generated by the imaging unit that captures an optical image having a low-distortion region and a high-distortion region. That is, an image acquisition step is included therein. Also, a plurality of image acquisition units disposed at different positions are used in the first embodiment.

The different-angle-of-view lenses 21c to 24c as the optical system are each configured by one or more optical lenses, have the projection characteristic y(θ) satisfying the condition of equation (1), and form optical images having a low-distortion region and a high-distortion region on the light receiving surfaces of the imaging elements 21d to 24d. The imaging elements 21d to 24d each photoelectrically convert the optical image to output a captured image signal. For example, RGB color filters are disposed for each pixel on the light receiving surfaces of the imaging elements 21d to 24d. An RGB disposition is, for example, a Bayer disposition.

Therefore, the imaging element is configured to sequentially output, for example, R, G, R, and G signals from a predetermined row, and G, B, G, and B signals from an adjacent row according to the Bayer disposition.

Reference signs 31 to 34 denote the camera processing units, which are housed together with the imaging units 21 to 24 in the same housings of the camera units 11 to 14 and process the captured image signal output from the imaging units 21 to 24. Further, in FIG. 3, details of the imaging unit 24, the camera processing unit 34, and wirings thereof are omitted for convenience.

The camera processing units 31 to 34 include image processing units 31a to 34a, recognition units 31b to 34b, and camera information units 31c to 34c. The image processing units 31a to 34a process the captured image signal output from the imaging units 21 to 24. Further, a part or all of the camera processing unit 31 may be performed by signal processing units laminated in the imaging elements 21d to 24d.

Specifically, the image processing units 31a to 34a performs debayer processing on image data input from the imaging units 21 to 24 according to the Bayer disposition, and convert the image data into RGB raster format image data. Further, correction processing of various types such as white balance adjustment, gain/offset adjustment, gamma processing, color matrix processing, and lossless compression processing are performed. However, a so-called RAW image signal is formed without performing lossy compression processing or the like.

The recognition units 31b to 34b (first image recognition unit) each recognize an image of each predetermined object (for example, an automobile, a person, an obstacle, or the like) from non-distortion-corrected RAW image signals that have been image-processed by the image processing units 31a to 34a. That is, the recognition units 31b to 34b performs image recognition on the image signal corresponding to the low-distortion region in a state of the RAW image signal without distortion-correction, and output a first image recognition result.

Further, the recognition units 31b to 34b of the first embodiment perform the image recognition processing for the RAW image signal obtained from at least the high-resolution region 10a, and recognize the predetermined object Therefore, the image recognition processing may be performed after cutting out only the high-resolution region 10a.

Further, at this time, the recognition units 31b to 34b may perform image recognition processing on the RAW image signal obtained from the low-resolution region 10b. However, since the RAW image signal has not been corrected for distortion, an image in a peripheral portion of the different-angle-of-view lens has a large distortion and recognition reliability is lowered.

Alternatively, the recognition units 31b to 34b may cut out the RAW image signal obtained from the high-resolution region 10a and then perform the image recognition processing only on the cut-out RAW image signal obtained from the high-resolution region 10a.

Further, the region to be cut out for image recognition at that time is preferably a rectangle having a shape suitable for image recognition processing. Also, the rectangular region to be cut out may be only a part (for example, a rectangle inscribed in the high-resolution region 10a) of the high-resolution region 10a, or may be a rectangle including both the high-resolution region 10a and the low-resolution region 10b.

Here, the recognition units 31b to 34b function as a first image recognition unit that performs image recognition on the basis of an image signal of at least a partial region among the image signals acquired by the imaging unit (image acquisition unit) to output the first image recognition result. Further, in the first embodiment, the partial region is a region corresponding to the low-distortion region.

The recognition units 31b to 34b transmit types of the object and a set of coordinates to an integrated processing unit 40 as a recognition result.

On the other hand, the recognition units 31b to 34b receive prediction information which is a set including types of the object and information on a moving direction of the object or information on a priority recognition region from an integrated control unit 41c of the integrated processing unit 40. This prediction information will be described later.

Here, an output of the recognition unit 31b of the camera unit 11 installed with respect to the front is directly supplied to a travel control unit (ECU) 60. This is because it may be necessary to immediately stop traveling or control the traveling to avoid an obstacle on the basis of the recognition result of the recognition unit 31b such as an obstacle.

The camera information units 31c to 34c (characteristics information holding unit) hold camera information of the camera units 11 to 14 in a memory in advance. The camera information unit can also temporarily hold information from various sensors and the like provided in the camera units 11 to 14. The camera information includes characteristic information (resolution boundary information or the like) of the optical image as shown in FIG. 2 formed by, for example, the different-angle-of-view lenses 21c to 24c.

Also, the camera information includes the number of pixels of the imaging element 21d to 24d, information on mounting position coordinates and postures (pitch, roll, yaw, and the like) of the camera unit in vehicle coordinates, a direction of image capturing, and the like. The camera information may include information such as gamma characteristics, sensitivity characteristics, and a frame rate.

Further, the camera information may include information on an image processing method and an image format when the RAW image signal is generated in the image processing units 31a to 34a.

Further, since a mounting position with respect to a vehicle is often determined for each camera unit, the mounting position coordinates may be stored in the memory in the camera information unit in advance. Also, posture coordinates of the camera unit are coordinates relative to the vehicle 1 and may be acquired from an encoder (not shown) or the like provided in the camera unit. Alternatively, the posture coordinates may be acquired using a three-dimensional acceleration sensor or the like.

Also, information on the direction of image capturing may be acquired by using, for example, a geomagnetic sensor. Since the resolution boundary information of the camera is determined by a lens design, it is stored in the memory in the camera information unit in advance.

Further, the camera information is information peculiar to the imaging units 21 to 24, is different from each other, and those pieces of information are transmitted to the integrated processing unit 40 and is referred to when image processing or the like is performed in the integrated processing unit 40. Here, the camera information units 31c to 34c function as a characteristics information holding unit that holds characteristic information on characteristics of an optical image.

Further, a CPU as a computer and a memory for storing a computer program as a storage medium are incorporated in the camera processing units 31 to 34. Also, the CPU is configured to control each unit in the camera processing units 31 to 34 by executing the computer program in the memory.

Further, in the first embodiment, the image processing units 31a to 34a and the recognition units 31b to 34b use hardware such as a dedicated circuit (ASIC) or a processor (reconfigurable processor, DSP). Thereby, an increase in speed of image recognition in the high-resolution region can be realized, and a likelihood of avoiding an accident can be increased. Further, the image processing units 31a to 34a may have a distortion-correction function.

Further, a part or all of functional blocks inside the camera processing units 31 to 34 may be realized by causing the CPU to execute a computer program stored in the memory, but in that case, it is desirable to increase a processing speed of the CPU.

Reference sign 40 denotes the integrated processing unit, which includes a system on chip (SOC)/a field programmable gate army (FPGA) 41, a CPU 42 as a computer, and a memory 43 as a storage medium. The CPU 42 performs various controls of the entire image processing system 100 by executing a computer program stored in the memory 43. Further, in the first embodiment, the integrated processing unit 40 is housed in a housing separate from the camera unit.

The SOC/FPGA 41 includes an image processing unit 41a, a recognition unit 41b (second image recognition unit), and the integrated control unit 41c. The image processing unit 41a acquires the RAW image signals from the camera processing units 31 to 34, and acquires the camera information of the camera units 11 to 14 from the camera information units 31c to 34c.

As described above, the camera information includes optical characteristics of the different-angle-of-view lenses 21c to 24c, the number of pixels, photoelectric conversion characteristics, gamma characteristics, and sensitivity characteristics of the imaging elements 21d to 24d, format information of the RAW image signal, information of mounting coordinates and postures of the camera unit in vehicle coordinates, and the like.

The image processing unit 41a performs resolution conversion for the RAW image signals from the camera processing units 31 to 34 on the basis of those pieces of camera information, and performs distortion-correction for the image signals obtained from the low-resolution regions 10b of the imaging units 21 to 24.

That is, the image processing unit 41a performs distortion-correction for the image signal of the distortion-correction region on the basis of characteristics of the optical image, and generates a synthesized image by synthesizing the image signal on which distortion-correction has been performed and the image signal of a non-distortion-correction region without distortion-correction. That is, the image processing unit 41a also functions as a display signal generation unit, performs distortion-correction or the like, and performs a display signal generation step of generating a synthesized image. Further, in the first embodiment, the distortion-correction region can be set by a user or automatically.

In the first embodiment, the image processing unit 41a does not perform the distortion-correction because the image signal obtained from the high-resolution region 10a has almost no distortion. However, the image processing unit 41a may also perform simple distortion-correction on the image signal obtained from the high-resolution region 10a. Also, the image processing unit 41a performs lossy compression processing or the like on the RAW image signals sent from the camera processing units 31 to 34 as appropriate.

Also, the image processing unit 41a synthesizes the image signal of the low-resolution regions 10b of the imaging units 21 to 24 to which distortion-correction has been performed and the image signal of the high-resolution region 10a to be smoothly joined together to form the entire image for each of the imaging units 21 to 24.

Further, if distortion-correction is performed on both the image signal of the low-resolution region 10b and the image signal obtained from the high-resolution region 10a, the RAW image signals obtained by the image processing units 31a to 34a may be corrected for distortion as they are.

The recognition unit 41b performs image recognition processing with respect to the entire image for each of the imaging units 21 to 24 after performing distortion-correction on at least the low-resolution region, and recognizes an image of a predetermined object (for example, an automobile, a person, an obstacle, or the like) in the entire image for each of the imaging units 21 to 24. That is, the recognition unit 41b performs the image recognition after performing distortion-correction on the image signal corresponding to at least the low-resolution region (high-distortion region), and outputs a second image recognition result.

At that time, recognition results (type and coordinates of the object) by the recognition units 31b to 34b are also referred to. Further, in the above description, the recognition unit 41b performs image recognition with respect to the entire image for each of the imaging units 21 to 24, but the image recognition for the entire image may not necessarily be performed. For example, it is not necessary to perform image recognition for a peripheral portion of the image.

That is, the recognition unit 41b may recognize, for example, a wider region including the regions recognized by the recognition units 31b to 34b.

Here, the recognition unit 41b functions as a second image recognition unit that performs image recognition on an image signal of a region wider than a partial region including the partial region on which image recognition has been performed by the first image recognition unit among the image signals acquired by the image acquisition unit to output the second image recognition result. Further, the second image recognition unit performs image recognition for a synthesized image obtained by synthesizing image signals corresponding to the high-resolution region 10a as the low-distortion region and the low-resolution region 10b as the high-distortion region to output the second image recognition result.

In the first embodiment, the image processing unit 41a synthesizes images from the camera units 12 to 14 as a plurality of imaging units to be smoothly joined together to form a panoramic synthesized image.

In that case, it is desirable that images of the plurality of imaging units to be interfaced be set so that at least a part of each imaging angle of view has a predetermined amount or more of overlap region with each other.

As will be described later, the camera units 12 and 13 are disposed so that imaging ranges overlap each other. Also, the camera units 13 and 14 are disposed so that imaging ranges overlap each other. Moreover, at that time, the camera units are disposed so that imaging ranges of the low-distortion regions of at least two image acquisition units overlap each other.

Also, the recognition unit 41b performs image recognition for a panoramic synthesized image thereof. Thereby, it is possible to recognize an image of an object imaged, for example, to straddle angles of view of the plurality of imaging units. This is because, the entire image of the object may not be known from the individual entire image from each imaging unit, but in the panoramic synthesized image, there are cases in which almost the entire of the object is reflected and the image recognition is possible by image processing.

For example, if a recognition result by the recognition units 31b to 34b and a recognition result by the recognition unit 41b are different, the integrated control unit 41c outputs an integrated image recognition result by adopting a recognition result on a side with higher reliability.

For example, a proportion of the object occupied in the image recognized by the recognition units 31b to 34b and a proportion of the same object occupied in a screen recognized by the recognition unit 41b are compared, and a recognition result on a side having a larger proportion may be determined to have higher reliability and adopted.

Alternatively, in a case of an object that straddles both the high-resolution region and the low-resolution region, the recognition result by the recognition unit 41b may be determined to have higher reliability than the recognition result by the recognition units 31b to 34b and adopted. Alternatively, if a position of the object recognized by the recognition units 31b to 34b is at a peripheral portion of an image, the reliability may be determined to be low, and the recognition result by the recognition unit 41b may be determined to have higher reliability and adopted.

Alternatively, in the recognition unit 41b, image recognition may be performed only on the low-resolution region with the low-resolution region corrected for distortion, and if there is an object that straddles the low-resolution region and the high-resolution region, image recognition may be performed for the object. That is, for an object that is present only in the high-resolution region, reliability of recognition by the recognition units 31b to 34b is considered to be high, and the recognition unit 41*b* may be controlled not to perform the image recognition processing.

Here, the integrated control unit 41*c* functions as an integrated processing unit that outputs an image recognition result integrated on the basis of the reliability of the first image recognition result and the reliability of the second image recognition result.

Also, the integrated control unit 41*c* forms a signal for displaying a desired image among the entire image for each of the imaging units 21 to 24, a panoramic synthesized image, and the like on a first display unit 50, a second display unit 51, and the like. Also, a frame for highlighting a recognized object, information on a type, a size, a position, a speed, or the like of the object, CG for warning, and the like are generated. Further, a CG of the boundary image for displaying the boundary is generated on the basis of characteristic information of the optical system such as display resolution boundary information acquired from the camera information units 31*c* to 34*c*.

Also, display processing or the like for superimposing these CGs and characters on the image is performed. Here, the first display unit 50, the second display unit 51, and the like function as display units and display image signals and integrated image recognition results.

Furthermore, in the first embodiment, the integrated control unit 41*c* is configured to share information on the recognized object among the plurality of camera units. That is, for example, an object recognized by the camera unit 14 is assumed to move in a direction of the angle of view of the camera unit 11.

In that case, the integrated control unit 41*c* transmits prediction information including types of the object and information on a moving direction of the object or information on the priority recognition region to the recognition unit 31*b* of the camera unit 11.

When such prediction information is shared with the recognition units 31*b* to 34*b* of the camera units 11 to 14, an image recognition accuracy of the recognition units 31*b* to 34*b* of the camera units 11 to 14 can be improved. Further, an advantage of sharing such prediction information is particularly effective when the recognition units 31*b* to 34*b* of the camera units 11 to 14 are provided separately from the recognition unit 41*b* of the integrated processing unit 40.

Also, the integrated control unit 41*c* communicates with the travel control unit (ECU) 60 or the like via a communication unit (not shown) provided inside using a protocol such as CAN, FlexRay, or Ethernet. Thereby, display processing that appropriately changes information to be displayed on the basis of a vehicle control signal received from the travel control unit (ECU) 60 or the like is performed. That is, for example, a range of the image or the like to be displayed on the display unit is changed according to a moving state of the vehicle acquired by the vehicle control signal.

Further, the travel control unit (ECU) 60 is mounted on the vehicle 1 and is a unit in which a computer and a memory for comprehensively performing drive control, direction control, and the like of the vehicle 1 are incorporated. From the travel control unit (ECU) 60, information on vehicle travel (moving state) such as, for example, a travel speed, a travel direction, a shift lever, a shift gear, a state of turn signals, and a vehicle orientation due to geomagnetic sensors, and the like is input to the integrated processing unit 40 as vehicle control signals.

Conversely, the integrated control unit 41*c* transmits information such as a type, a position, a moving direction, and a moving speed of a predetermined object (obstacle or the like) recognized by the recognition unit 41*b* to the travel control unit (ECU) 60. Thereby, the travel control unit (ECU) 60 performs control required for avoiding obstacles such as stopping, driving, or changing a traveling direction of the vehicle. Here, the travel control unit (ECU) 60 functions as a movement control unit that controls movement of the vehicle as the mobile object on the basis of the integrated image recognition result.

The first display unit 50 is installed, for example, in the vicinity of a center in a vehicle width direction on a front upper portion of a driver's seat of the vehicle 1 with the display screen facing the rear of the vehicle, and functions as an electronic rearview mirror. Further, the first display unit 50 may be configured so that it can be used as a mirror by using a semitransparent mirror or the like when it is not used as a display. Also, the first display unit 50 may be configured to include a touch panel and operation buttons to be able to acquire an instruction from the user and output it to the integrated control unit 41*c*.

The second display unit 51 is installed, for example, around an operation panel in the vicinity of the center in the vehicle width direction in front of the driver's seat of the vehicle 1. Further, a navigation system (not shown), an audio system, and the like are mounted in the vehicle 1 as the mobile object.

Then, for example, control signals of various types from the navigation system, the audio system, the travel control unit (ECU) 60, and the like can be displayed on the second display unit. Also, the second display unit 51 may be configured to include a touch panel and operation buttons to be able to acquire an instruction from the user.

Further, the second display unit 51 may be, for example, a display unit of a tablet terminal, can be displayed by being connected to the integrated processing unit 40 by wire, or can also wirelessly receive and display an image via a communication unit 62.

Further, as a display panel of the first display unit 50 and the second display unit 51, a liquid crystal display, an organic EL display, or the like can be used. Further, the number of display units is not limited to two.

Further, a part or all of the functional blocks included in the integrated processing unit 40 or the like may be realized by hardware, or may be realized by causing the CPU 42 to execute a computer program stored in the memory 43. As the hardware, a dedicated circuit (ASIC), a processor (reconfigurable processor, DSP), or the like can be used.

Further, a part or all of the image processing performed by the image processing units 31*a* to 34*a* may be performed by the image processing unit 41*a* of the integrated processing unit 40. That is, in the first embodiment, for example, the image acquisition unit and the first image recognition unit are housed in the housing of the same camera unit, and the camera unit and the second image recognition unit are housed in separate housings. However, for example, the first image recognition unit may be housed in the housing of the integrated processing unit 40 together with the second image recognition unit.

Further, in the first embodiment, the integrated processing unit 40 is mounted in the vehicle 1 as the mobile object, but a part of the processing of the image processing unit 41*a*, the recognition unit 41*b*, and the integrated control unit 41*c* of the integrated processing unit 40 may be performed by, for example, an external server or the like via a network.

In that case, for example, the imaging units 21 to 24 as the image acquisition units are mounted in the vehicle 1 as the mobile object, but for example, some of the functions of the camera processing units 31 to 34 and the integrated processing unit 40 can be processed by the external server or the like. It is also possible to make the travel control unit (ECU) 60 hold some or all of the functions of the integrated processing unit 40.

Reference sign 61 denotes a storage unit, which stores the entire image of each of the imaging units 21 to 24 generated by the integrated processing unit 40 and a panoramic synthesized image. Further, a predetermined frame indicating a recognized object, a CG such as characters and warnings, and an image on which the CG is superimposed and displayed on the first display unit 50, the second display unit 51, and the like are stored together with a time, GPS information, or the like. The integrated processing unit 40 can reproduce past information stored in the storage unit 61 and display it on the first display unit 50 or the second display unit 51.

Reference sign 62 denotes a communication unit, which is for communicating with an external server or the like via a network and can transmit information before being stored in the storage unit 61 or past information stored in the storage unit 61 to an external server or the like to store the information in the external server or the like. Also, as described above, an image can be transmitted to an external tablet terminal or the like, and the image can be displayed on the second display unit 51 which is a display unit of the tablet terminal.

Also, it is also possible to acquire traffic congestion information and information of various types from an external server or the like and display them on the first display unit 50 or the second display unit 51 via the integrated processing unit 40. Reference sign 63 denotes an operation unit for inputting various instructions to the image processing system by an operation of the user. The operation unit includes, for example, a touch panel and operation buttons.

Figure 4:
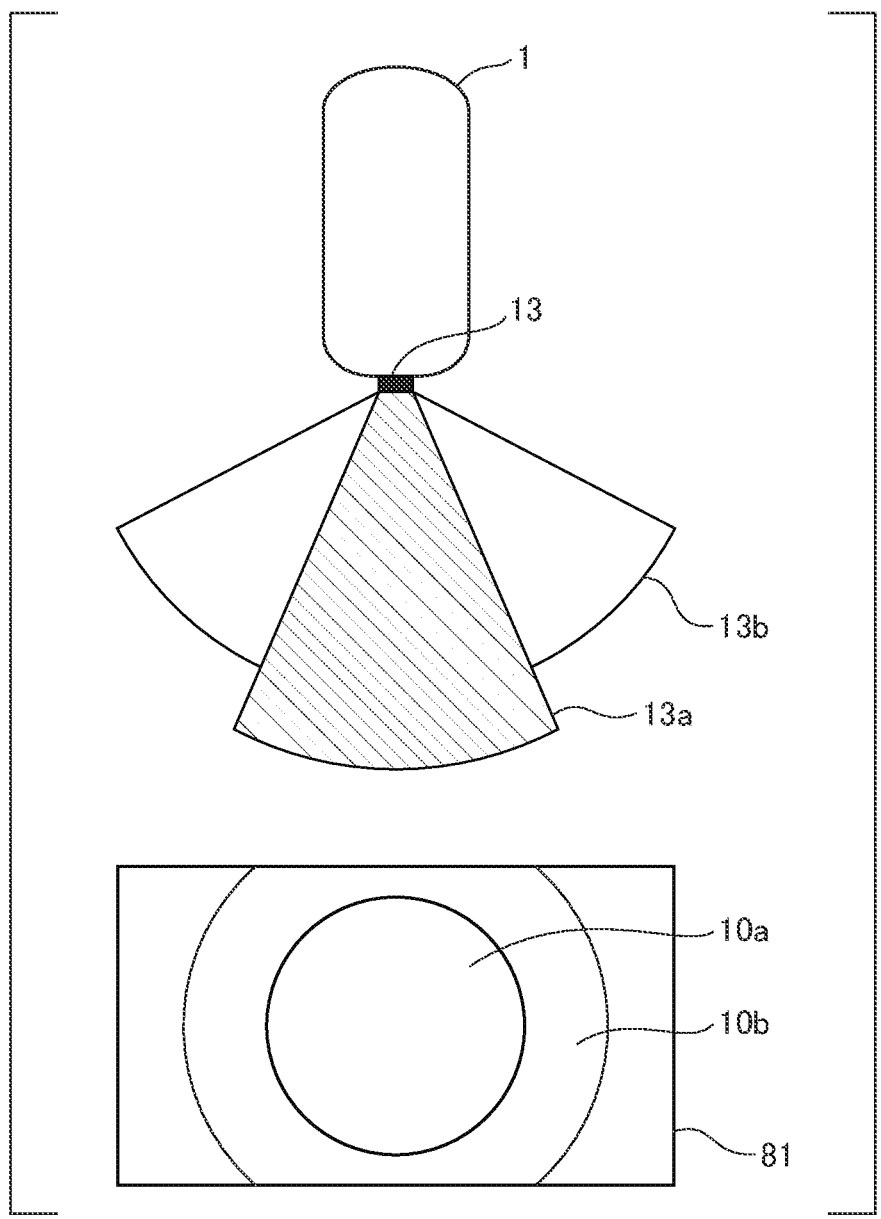
FIG. 4 is a diagram for explaining a correspondence relationship between an angle of view, a high-resolution region, and a low-resolution region of a camera unit 13 on a rear side in the first embodiment.

FIG. 4 is a diagram for explaining a correspondence relationship between the angle of view, the high-resolution region, and the low-resolution region of the camera unit 13 on a rear side in the first embodiment. As shown in FIG. 4, an image of the camera unit 13 on the rear side having the imaging angle of view 13a in which a high-resolution and low-distortion image can be captured is formed in the high-resolution region (low-distortion region) 10a of a light receiving surface 81 of the imaging element. Also, an image of the imaging angle of view 13b in which a low-resolution and high-distortion image can be captured is formed in the low-resolution region (high-distortion region) 10b of the light receiving surface 81 of the imaging element.

Figure 5A:
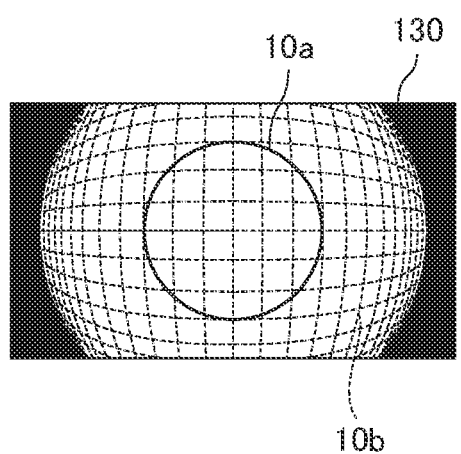
FIG. 5A is a diagram showing an example of an image signal obtained from an imaging element when distortion-correction is not performed.

FIG. 5A is a diagram showing an example of an image signal obtained from the imaging element when distortion-correction is not performed. As shown in FIG. 5A, distortion is small in the image obtained from the high-resolution region (low-distortion region) 10a, but the image obtained from the low-resolution region (high-distortion region) 10b has large distortion.

Figure 5B:
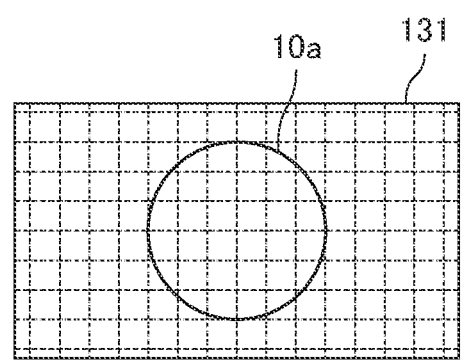
FIG. 5B is a diagram for explaining an image signal after distortion-correction.

FIG. 5B is a diagram for explaining an image signal after distortion-correction, and the distortion of the image signal from the low-resolution region (high-distortion region) 10b is corrected as shown in the figure. However, even if the distortion is corrected, distortion in the peripheral portion of the image may slightly remain.

Figure 6A:
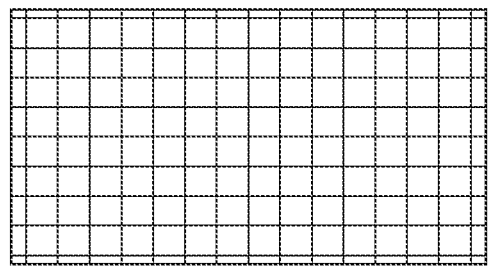
FIG. 6A is a diagram showing an example in which distortion is corrected for an entire screen.

FIG. 6A is a diagram showing an example in which distortion is corrected for the entire screen. In this case, a delay is generated even in the low-distortion region (high-resolution region), but it is easier to recognize an object compared to a case before the distortion-correction. Also, the high-distortion region (low-resolution region) is easier to recognize (recognize an image of or visually recognize) the object, but a delay is generated.

Figure 6B:
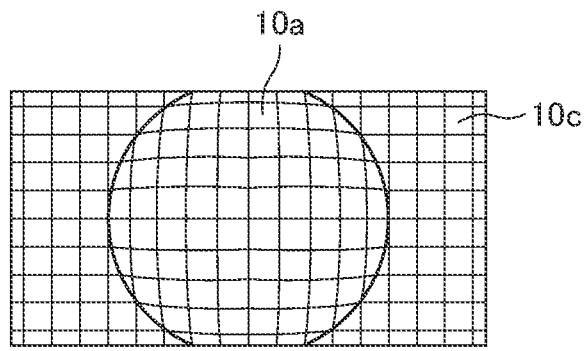
FIG. 6B is a diagram showing an example of synthesizing images by performing distortion-correction on an image of the low-resolution region without performing distortion-correction on an image of the high-resolution region.

FIG. 6B is a diagram showing an example of synthesizing images by performing distortion-correction on an image obtained from the low-resolution region (high-distortion region) 10b without performing distortion-correction on an image obtained from the high-resolution region (low-distortion region) 10a. In a case of this example, a delay does not occur in the high-resolution region (low-distortion region), but there is a delay in the low-resolution region (high-distortion region). Since the high-resolution region has low-distortion even without distortion-correction, recognition processing of the object can be performed without a major problem.

Further, the distortion-correction in the first embodiment is correction processing for reducing distortion, and distortion may remain, for example, in a portion such as a peripheral portion including a case in which the distortion does not become zero. Further, in FIG. 6B, images are synthesized by correcting distortion of the image obtained from the low-resolution region (high-distortion region) 10b to obtain the image 10c without correcting distortion of the image obtained from the high-resolution region (low-distortion region) 10a. However, the region without distortion-correction is not limited to the circular high-resolution region (low-distortion region) 10a as shown in FIG. 6B. The region without distortion-correction may have another shape such as a rectangle, and a size and a position thereof may be changeable.

Figure 6C:
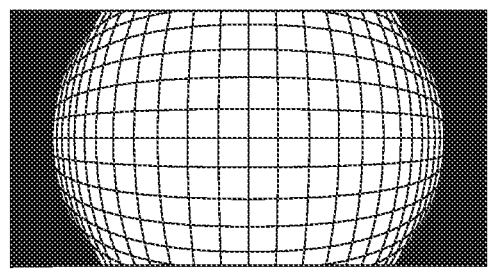
FIG. 6C is a diagram showing an example of a case in which distortion-correction is not performed for the entire screen.

Further, FIG. 6C is a diagram showing an example of a case in which distortion-correction is not performed for the entire screen. In a case of this example, a delay is not generated in the screen display, but there is a problem that it is difficult to recognize (recognize an image of or visually recognize) the object in a peripheral portion of the imaging region.

In the first embodiment, it is configured such that these three display patterns (a shape, a position, and a size of a region for distortion-correction) are appropriately switched. Further, as described above, a shape, a position, and a size of a region for distortion-correction (or a region without distortion-correction) may be switched.

Figure 7:
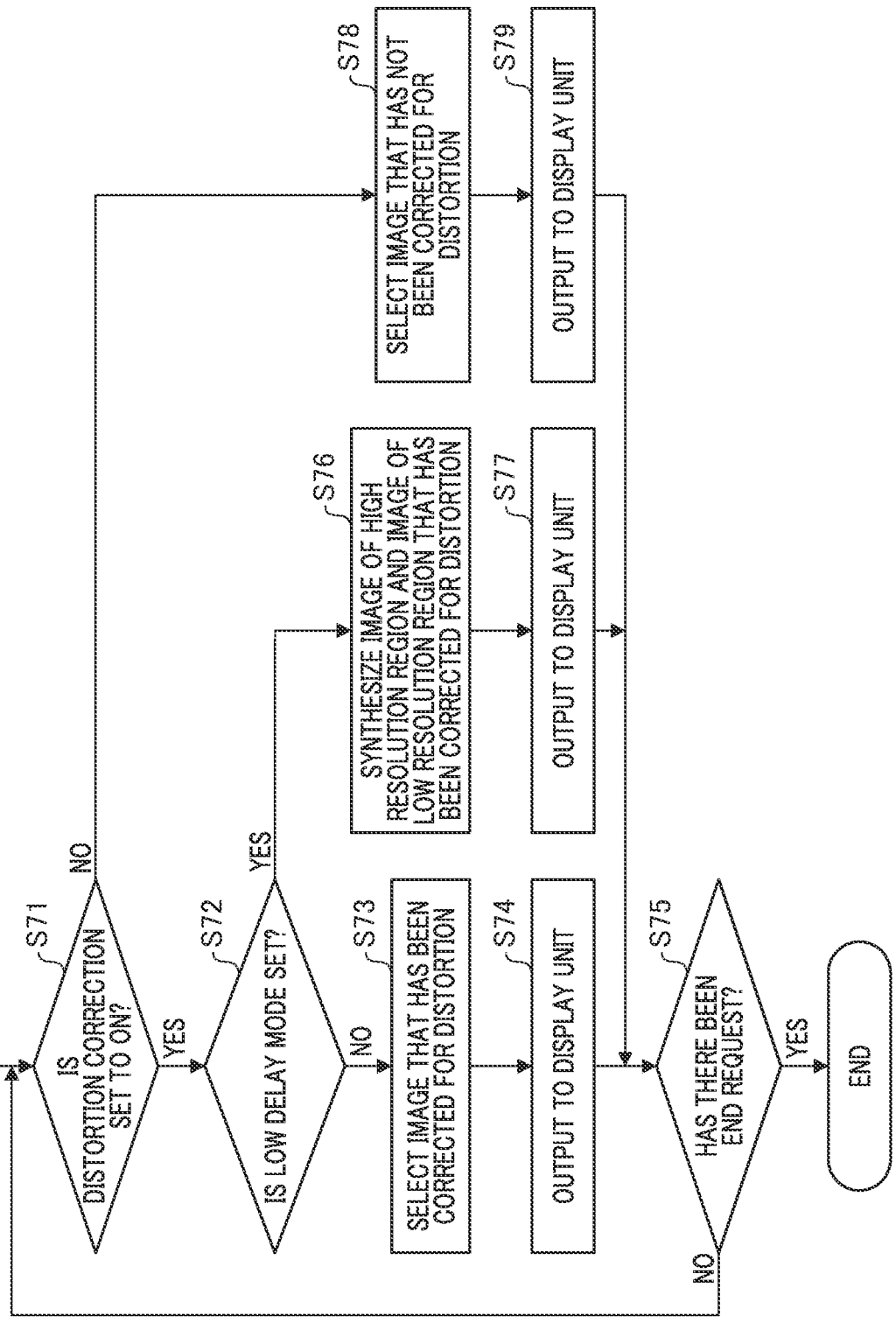
FIG. 7 is a flowchart for explaining an example of a case in which a pattern of FIG. 6 is manually switched.

FIG. 7 is a flowchart for explaining an example of a case in which the pattern of FIG. 6 is manually switched. The flow of FIG. 7 is processed, for example, in units of frame by causing the CPU 42 of the integrated processing unit 40 to execute a computer program in the memory 43 according to a user input from the operation unit 63 or the like. Here, the user may be an operator of the vehicle 1 or an expert who maintains the vehicle.

In FIG. 7, it is determined in step S71 whether distortion-correction is set to ON by the operation unit 63 or the like. In a case of Yes, the processing proceeds to step S72, and it is determined whether a low delay mode is set by the operation unit 63 or the like. If it is determined to be No in step S72, the processing proceeds to step S73, an image in which the entire screen has been corrected for distortion is selected, and then it is output to the display unit in step S74.

In this case, an image in which the entire screen has been corrected for distortion as shown in FIG. 6A is displayed on the first display unit 50 or the second display unit 51. Further, when the entire screen is corrected for distortion, the image processing unit 41a performs distortion-correction of the entire screen on the basis of the characteristic information of the optical system acquired from the camera information units 31c to 34c.

In a case of Yes in step S72, that is, if the low delay mode is set, the processing proceeds to step S76. Then, on the basis of the characteristic information of the optical system, the image obtained from the low-resolution region (high-distortion region) 10b is corrected for distortion while the image obtained from the high-resolution region (low-distortion region) 10a is not corrected for distortion, and both the images are synthesized.

Then, the synthesized image signal is displayed on the first display unit 50 or the second display unit 51 in step S77. The image displayed at this time is the image shown in FIG. 6B. Further, at this time, it may be configured such that the user can arbitrarily set a position, a size, a shape of the region for distortion-correction (the region without distortion-correction).

In a case of No in step S71, that is, if distortion-correction is not set to ON, the processing proceeds to step S78, the entire image that has not been corrected for distortion is selected, and then the image signal is displayed on the first display unit 50 or the second display unit 51 in step S79. The image displayed at this time is an image in which the entire screen is distorted as shown in FIG. 6C.

As described above, the flow of FIG. 7 is configured so that the user can select and set which region of the images screen to be corrected for distortion by using the operation unit 63 or the like. Thereby, since the entire image with little distortion, for example, as shown in FIG. 6A can be displayed in steps S73 and S74, if a high quality image is desired to be displayed, such a selection can be made.

However, in this case, there is a disadvantage in that it takes time to correct the distortion. Also, for example, if it is desired to quickly recognize (recognize an image of or visually recognize) only a central portion, the image as shown in FIG. 6B can be displayed by steps S76 and S77. In this case, since it does not take time to correct distortion for the central portion, an image of an obstacle or the like can be recognized in a short period of time.

On the other hand, a high-quality image with little distortion can be obtained except for the central portion or the like, and thus an image recognition accuracy improves. Also, if it is desired to immediately recognize an image of the obstacle, an image in which the entire screen is distorted as shown in FIG. 6C can be quickly displayed by steps S78 and S79. However, a recognition accuracy when the image is recognized is lowered in the peripheral portion.

Further, after the display is performed in steps S74, S77, and S79, the processing proceeds to step S75 to determine whether or not there has been an end request from the user, and if it is determined as Yes, the flow of FIG. 7 ends, and if it is determined as No, the processing returns to step S71.

In the first embodiment, an optimum distortion processing region can be selected by configuring the region for distortion-correction (or the non-distortion-correction region without distortion-correction) to be manually selected by the user using the operation unit 63 or the like. That is, it is possible to appropriately display an image that is easy for the user to recognize with little delay, and it is possible to further bring out performance of the image processing system that uses the optical system such as a different-angle-of-view lens.

Further, in the flow of FIG. 7, steps S71 and S72 using the operation unit 63 or the like function as setting steps (setting units) for setting a distortion-correction region on which distortion-correction is performed for the image signal on the basis of characteristics of the optical image and a non-distortion-correction region without distortion-correction. Also, a state in which the entire screen is set as the distortion-correction region and a state in which the entire screen is set as the non-distortion-correction region can be set by steps S71 and S72.

Also, it is desirable that setting of the distortion-correction region and the non-distortion-correction region without distortion-correction by the user be further facilitated by using a UI such as a menu selection screen in the operation unit 63 or the like.

Further, if the selection or setting is made by the user using the operation unit 63 or the like, the UI may be configured so that the user selects one of, for example, FIGS. 6A to 6C from a plurality of menus. Alternatively, for example, FIG. 6B or the like may be displayed on a screen of an external PC terminal via the communication unit 62. Then, the UI may be configured such that, for example, a position, a size, and a shape of the region for distortion-correction (the region without distortion-correction) are changed by a touch operation, a click operation, a drag operation, or the like on the screen of the PC terminal.

Here, the circular high-resolution region 10a as shown in FIG. 6B has been described as the region without distortion-correction in steps S76 and S77 described above, but a position, a size, and a shape of the region without distortion-correction can be set by the user.

Second Embodiment

Figure 8:
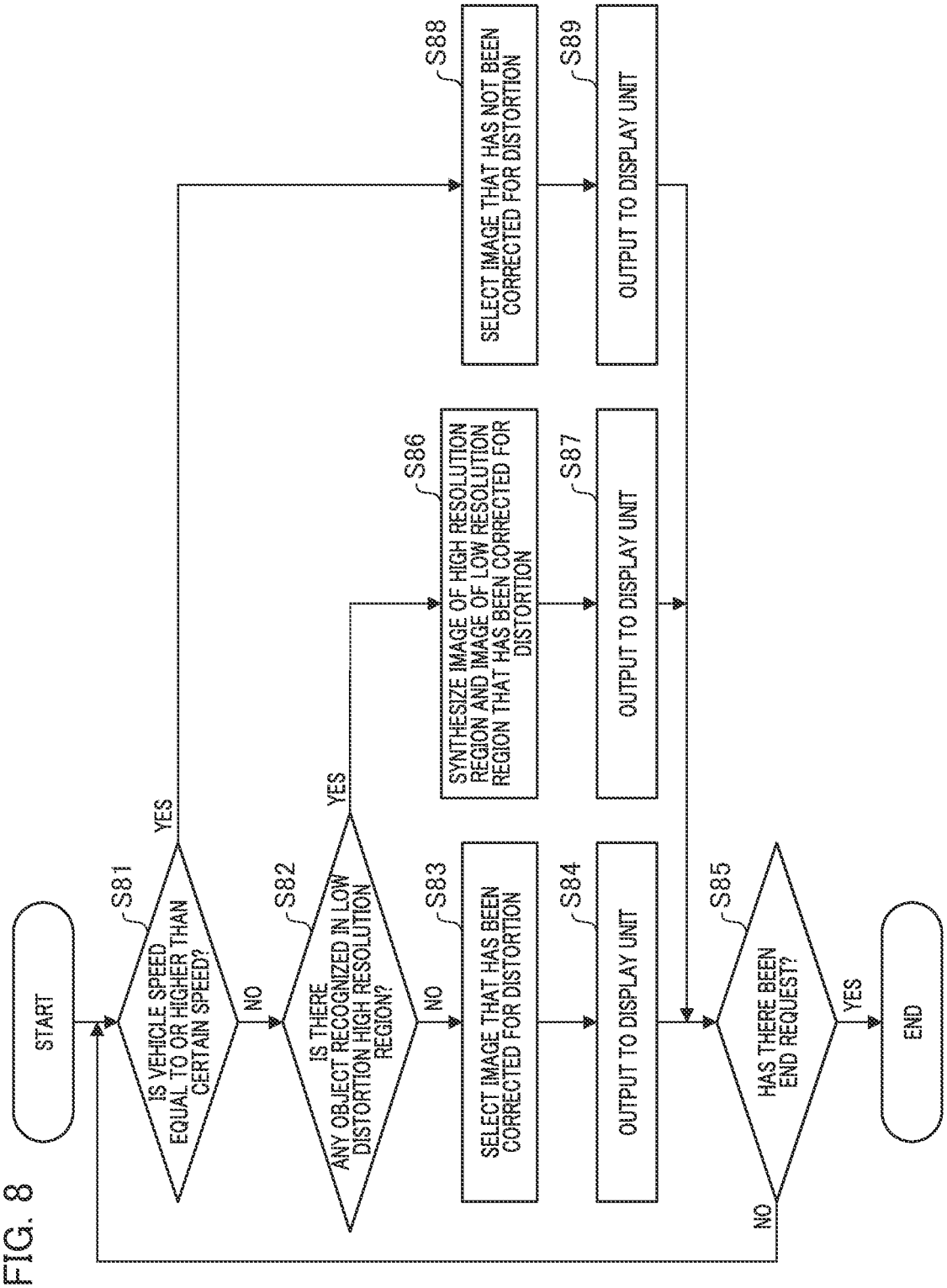
FIG. 8 is a flowchart for explaining a distortion region selection example in a second embodiment.

Selection of the distortion-correction region has been made manually in the first embodiment, but in a second embodiment, the selection is automatically performed. FIG. 8 is a flowchart for explaining a distortion region selection example in the second embodiment. The flow of FIG. 8 is processed, for example, in units of frame by a CPU 42 of an integrated processing unit 40 executing a computer program in a memory 43 according to a signal indicating a traveling state from a travel control unit (ECU) 60.

In step S81 of FIG. 8, it is determined whether a vehicle speed of a vehicle 1 is equal to or higher than a predetermined speed according to a signal indicating a traveling state from the travel control unit (ECU) 60. If it is determined to be No, the processing proceeds to step S82, and recognition units 31b to 34b recognize the image obtained from a high-resolution region (low-distortion region) 10a, and determine whether or not the object is recognized.

Further, an image recognition region in the recognition units 31b to 34b is, for example, a rectangular region initially set in the high-resolution region 10a in advance. That is, the recognition units 31b to 34b perform image recognition on the basis of a RAW image signal on which distortion-correction has not been performed by a distortion-correction unit.

In a case of No in step S82, that is, if an object is not recognized in the image obtained from the high-resolution region (low-distortion region) 10a, the processing proceeds to step S83, an image that has been corrected for distortion is selected, and the selected image is output to a display unit in step S84. In this case, an image in which the entire screen has been corrected for distortion as shown in FIG. 6A is displayed in a first display unit 50 or a second display unit 51. In a case of Yes in step S82, that is, if an object is recognized in the image obtained from the high-resolution region (low-distortion region) 10a, the processing proceeds to step S86.

Then, an image obtained from a low-resolution region (high-distortion region) 10b is corrected for distortion while the image obtained from the high-resolution region (low-distortion region) 10a is not corrected for distortion, and both the images are synthesized. Then, the synthesized image signal is displayed on the first display unit 50 or the second display unit 51 in step S87. The image displayed at this time is the image as shown in FIG. 6B. As described above, in the flow of FIG. 8, the distortion-correction region and the non-distortion-correction region without distortion-correction are set on the basis of results of the image recognition by the recognition units 31b to 34b as a first image recognition unit.

In a case of Yes in step S81, that is, if a speed of the vehicle 1 is higher than the predetermined speed, the processing proceeds to step S88, the entire image that has not been corrected for distortion is selected, and then the image signal is displayed on the first display unit 50 or the second display unit 51 in step S89. The image displayed at this time is an image in which the entire is distorted as shown in FIG. 6C.

In this way, which region of the imaged screen to be corrected for distortion is automatically selected, and thereby, for example, if the speed of the vehicle 1 is low, the entire image with little distortion as shown in FIG. 6A can be displayed by steps S83 and S84. Therefore, a high-quality image can be displayed. In this case, display is delayed because it takes time to correct the distortion, but delay in the display (image recognition or visual recognition) does not cause a problem because the speed of the vehicle 1 is low.

Also, for example, if an object is recognized in a central portion, an image as shown in FIG. 6B is displayed by steps S86 and S87. Therefore, since it does not take time to correct distortion for the central portion, an obstacle or the like can be recognized in a short period of time, and a high-quality image with little distortion can be obtained except for the central portion or the like.

Also, if the vehicle speed is equal to or higher than the predetermined speed, since an image in which the entire screen is distorted as shown in FIG. 6C can be quickly displayed by steps S88 and S89, an obstacle or the like can be quickly recognized and danger can be avoided. Moreover, since a peripheral region of the screen is also displayed, a range of image recognition is extended and an obstacle is easily recognized.

Further, after the display is performed in steps S84, S87, and S89, the processing proceeds to step S85 to determine whether or not there has been an end request from a user, and if it is determined as Yes, the flow of FIG. 8 ends, and if it is determined as No, the processing returns to step S81. Further, in the flow of FIG. 8, steps S81 and S82 function as setting steps (setting units) for setting a distortion-correction region on which distortion-correction is performed for the image signal on the basis of characteristics of the optical image and a non-distortion-correction region without distortion-correction.

Also, the distortion-correction region and the non-distortion-correction region without distortion-correction are set according to a moving state of the vehicle 1 as the mobile object by steps S81 and S82.

Further, in the first embodiment and second embodiment, the recognition units 31b to 34b perform image recognition on, for example, a rectangular region having a predetermined size on an inner side of the high-resolution region (low-distortion region) 10a, as described above. On the other hand, image recognition on the entire region corresponding to each display screen as shown in the examples of FIGS. 6A to 6C and the like is performed in the recognition unit 41b.

Further, also in the second embodiment, for example, if it is intended not to perform distortion-correction on a part of the screen as shown in FIG. 6B, it may be configured such that the user can set a region without distortion-correction (a region for distortion-correction) in advance by using an operation unit 63 or the like. That is, for example, a UI in which the user can select it from a plurality of options of a region without distortion-correction (a region for distortion-correction) may be used.

Alternatively, for example, FIG. 6B or the like may be displayed in advance on a screen of an external PC terminal or the like via a communication unit 62 so that, for example, a position, a size, or a shape of the region without distortion-correction can be set in advance by a UI of a touch operation, a click operation, a drag operation, or the like.

At that time, in FIG. 6B, the region without distortion-correction may be, for example, a region having a shape such as a rectangle set on an inner side of the high-resolution region 10a, and the region for distortion-correction may be a display region other than the rectangular region.

Further, when the user sets a position, a size, and a shape of the region without distortion-correction, it is desirable to display a boundary image between the high-resolution region 10a and the low-resolution region 10b on the basis of characteristic information of the optical system acquired from camera information units 31c to 34c. That is, since the setting can be made with reference to the boundary image, which portion to be corrected for distortion can be correctly determined.

As described above, in the second embodiment, it is configured such that the region for distortion-correction is automatically selected according to a moving state of the vehicle 1 as the mobile object, and thereby an optimum distortion processing region can be selected more quickly than a case of manual switching by a human. Therefore, it is possible to further bring out performance of the image processing system that uses the optical system such as a different-angle-of-view lens.

Further, in the second embodiment, if the speed of the vehicle 1 is equal to or higher than the predetermined speed, the display is switched to, for example, FIG. 6C. However, for example, if the speed of the vehicle 1 increases from a state of displaying FIG. 6A or FIG. 6B, the region without distortion-correction may be controlled to extend stepwise or continuously from a center of the screen toward a periphery thereof.

Also, a position, a size, and a shape of the region for distortion-correction (region without distortion-correction) may be changed according to a signal (for example, a turn signal operation signal, a steering angle signal, information on a traveling direction of the vehicle based on GPS, or the like) indicating a traveling state from the travel control unit (ECU) 60.

For example, in a state of right or left turn, the circular region without distortion-correction in FIG. 6B may be shifted from the center of the screen to the right or left. Alternatively, in a state of right or left turn, a shape of the region without distortion-correction in FIG. 6B may be a desired non-circular shape extended to the right or left.

Third Embodiment

Figure 9:
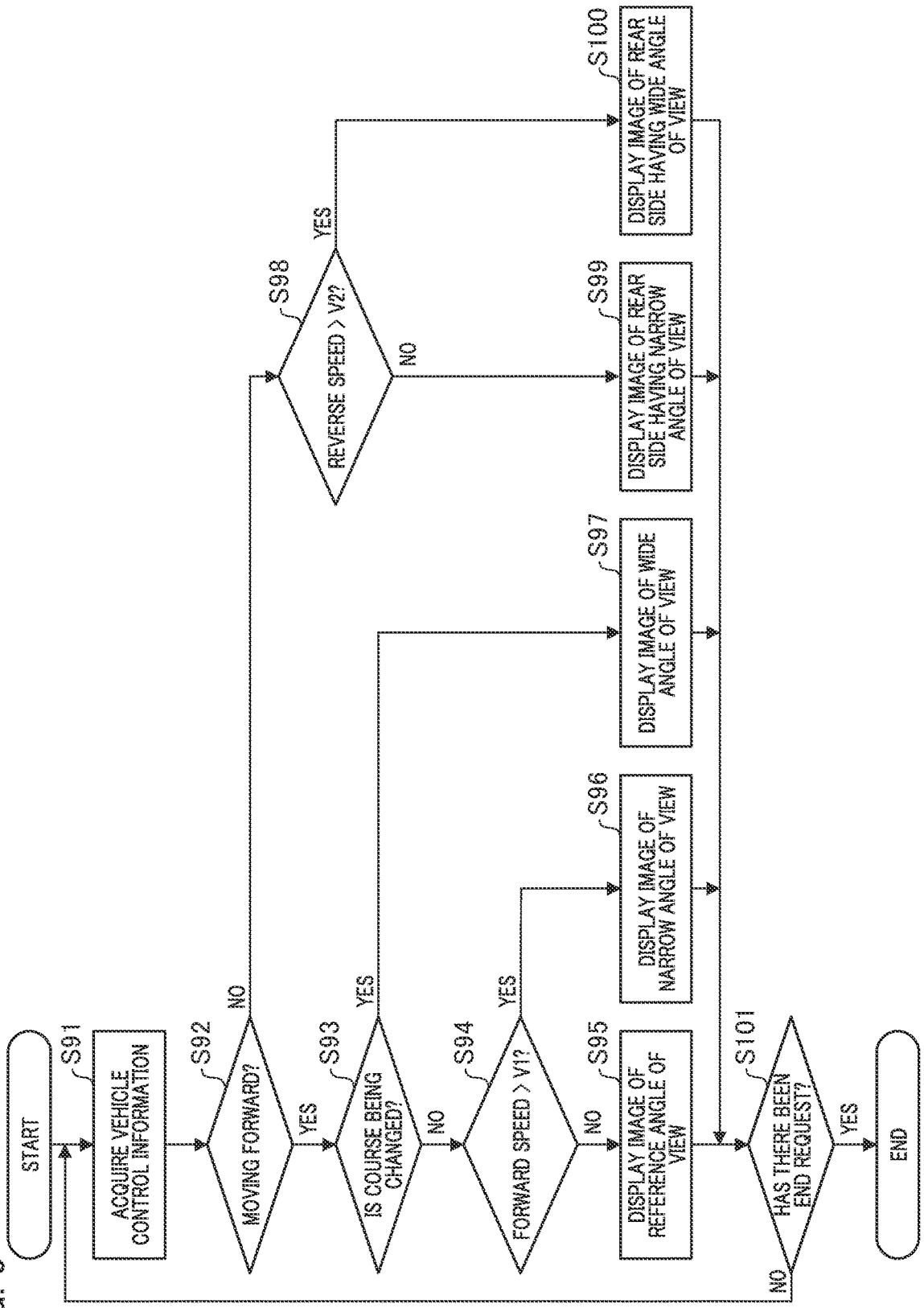
FIG. 9 is a flowchart for explaining a distortion region selection example in a third embodiment.

Next, FIG. 9 is a flowchart for explaining a distortion region selection example in a third embodiment. The flow of FIG. 9 is processed, for example, in units of frame by a CPU 42 of an integrated processing unit 40 executing a computer program in a memory 43 according to a signal indicating a traveling state from a travel control unit (ECU) 60.

Figure 10A:
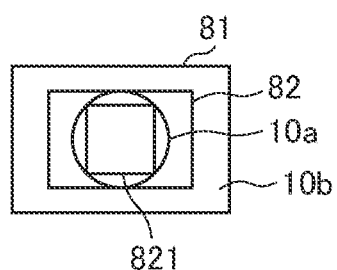
FIGS. 10A to 10E are diagrams for explaining examples of a distortion-correction region, a display region, and an image recognition region in the third embodiment.
Figure 10B:
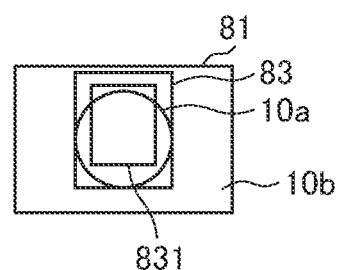

Also, FIG. 10 is a diagram for explaining an example of a distortion-correction region, a display region, and an image recognition region in the third embodiment FIG. 10A is a diagram for explaining an example of a display region 82 of a reference angle of view of each of camera units 11, 12, and 14, and FIG. 10B is a diagram for explaining an example of a display region 83 of a narrow angle of view of each of the camera units 11, 12, and 14.

Figure 10C:
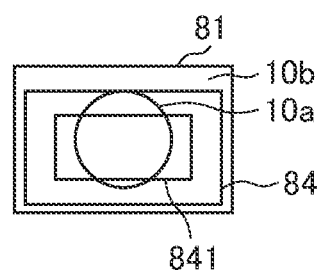
Figure 10D:
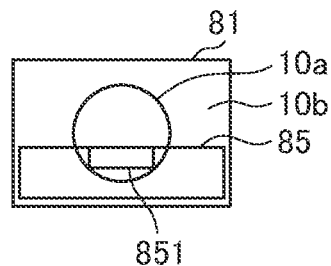
Figure 10E:
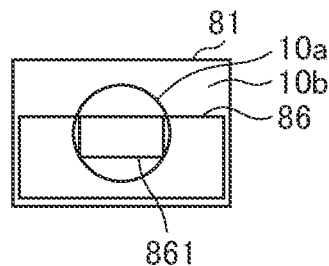

Also, FIG. 10C is a diagram for explaining an example of a display region 84 of a wide angle of view of each of the camera units 11, 12, and 14, and FIG. 10D is a diagram for explaining an example of a display region 85 of a narrow angle of view toward the rear of a camera unit 13. Also, FIG. 10E is a diagram for explaining an example of a display region 86 of a wide angle of view toward the rear of the camera unit 13.

In FIGS. 10A to 10E, reference sign 81 denotes a light receiving surface of an imaging element, reference sign 10a denotes a high-resolution region (low-distortion region) described with reference to FIG. 2, and reference sign 10b denotes a low-resolution region (high-distortion region). However, a boundary line between the high-resolution region (low-distortion region) 10a and the low-resolution region (high-distortion region) 10b is not displayed in a normally displayed image. However, the boundary line described above may be superimposed and displayed on a screen as necessary.

Further, in this example, a region recognized by a recognition unit 41b is, for example, the entire of the display region. Also, image recognition regions recognized by recognition units 31b to 34b are denoted by, for example, reference signs 821 to 861 in FIGS. 10A to 10E.

As shown in FIGS. 10A to 10E, a plurality of types of display regions, distortion-correction regions, and image recognition regions can be switched, and these regions are switched on the basis of vehicle control information from the travel control unit (ECU) 60.

In step S91 of FIG. 9, the vehicle control information is acquired from the travel control unit (ECU) 60. As described above, the vehicle control information includes, for example, information on traveling of a vehicle such as a traveling speed, a traveling direction, a shift lever, a shift gear, and a turn signal.

In step S92, it is determined whether or not the vehicle is in a state of moving forward on the basis of the vehicle control information. If it is determined to be moving forward, it is determined in step S93 whether or not a course is being changed, and if it is determined to be No, it is determined in step S94 whether or not a forward speed is larger than a predetermined threshold value V1.

If it is determined to be No in step S94, an image having the reference angle of view is displayed in step S95. That is, the image of the display region 82 of the reference angle of view in FIG. 10 is displayed on a first display unit 50 as, for example, an electronic rearview mirror, and then the processing proceeds to step S101.

Also, at this time, distortion-correction is not performed for an image in the high-resolution region (low-distortion region) 10a, and distortion-correction is performed on a region on an inner side of the display region 82 of the reference angle of view and on an outer side of the high-resolution region (low-distortion region) 10a. Also, the recognition units 31b to 34b perform image recognition on the image recognition region 821. On the other hand, the recognition unit 41b performs image recognition for the entire display region 82 of the reference angle of view.

FIG. 11 is a diagram for explaining a display example of the first display unit in the third embodiment. Also, FIG. 11A is a diagram for explaining a display example of an image of a reference angle of view, FIG. 11B is a diagram for explaining a display example of an image of a narrow angle of view, and FIG. 11C is a diagram for explaining a display example of an image of a narrow angle of view. In FIG. 11A, reference sign 501 denotes a display screen of the first display unit as an electronic rearview mirror.

Also, reference sign 82L denotes an image of a reference angle of view of the camera unit 14 on a left side, reference sign 82C denotes an image of a reference angle of view of the camera unit 11 on a front side, and reference sign 82R denotes an image of a reference angle of view of the camera unit 12 on a right side.

Figure 11A:
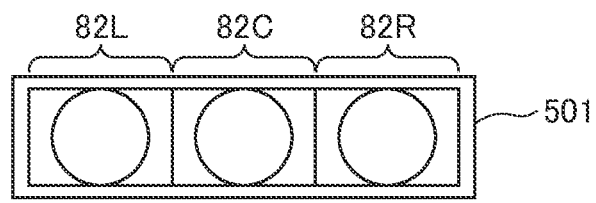
FIGS. 11A to 11D are diagrams for explaining a display example of a first display unit in the third embodiment.

If the image of the display region 82 of the reference angle of view of FIG. 10 is displayed on the first display unit 50, it is displayed as shown, for example, in FIG. 11A. That is, the image 82L of the reference angle of view of the camera unit 14 on the left side, the image 82C of the reference angle of view of the camera unit 11 on the front side, and the image 82R of the reference angle of view of the camera unit 12 on the right side are displayed to be aligned in order from the left on the display screen 501 of the first display unit 50.

Figure 12A:
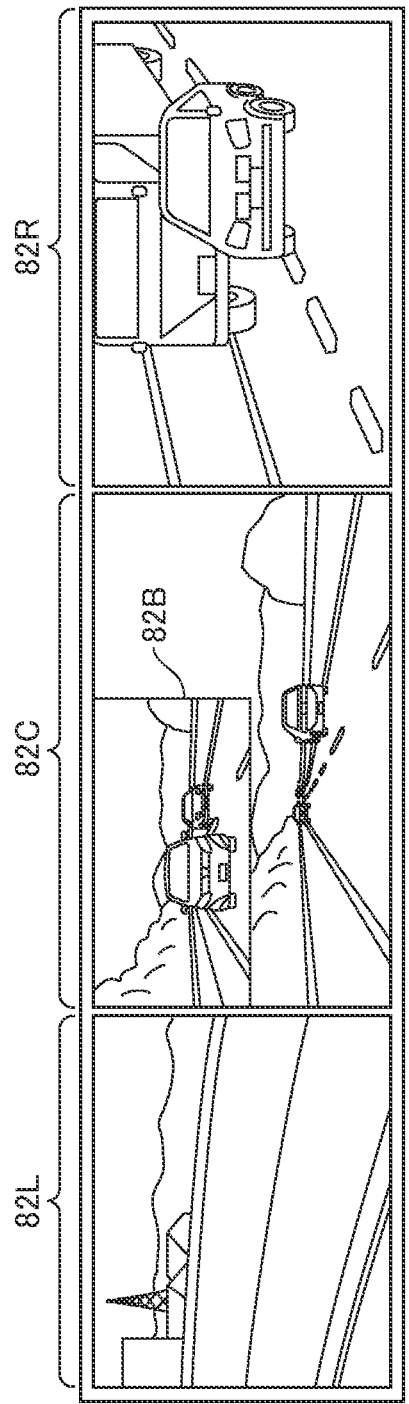
FIG. 12A is a diagram for explaining a display example of a display screen 501 of a first display unit 50 of the third embodiment.
Figure 12B:
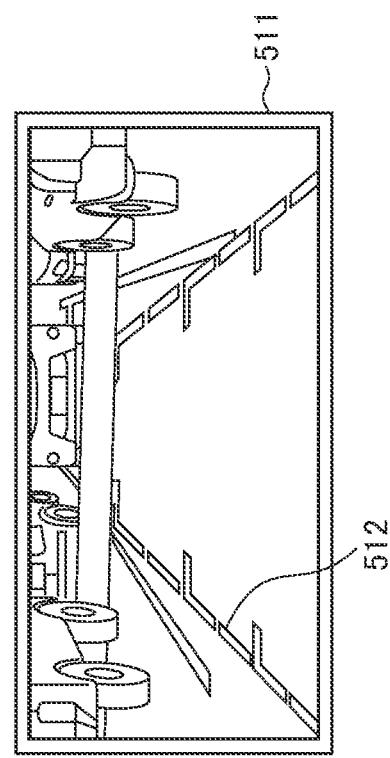
FIG. 12B is a diagram for explaining a display example of a display screen 511 of a second display unit 51 of the third embodiment.

FIG. 12A is a diagram for explaining a display example of the display screen 501 of the first display unit 50 of the third embodiment, and FIG. 12B is a diagram for explaining a display example of a display screen 511 of a second display unit 51 of the third embodiment.

As shown in FIG. 12A, if the forward speed is determined to be V1 or less in step S94, the images 82L, 82C, and 82R having the reference angle of view are displayed to be aligned on the display screen 501 of the first display unit 50.

Further, in FIG. 12A, reference sign 82B is an image of the reference angle of view of the camera unit 13 on a rear side and is displayed as a picture-in-picture within the display screen 501 of the first display unit 50. In the third embodiment, if the forward speed is determined to be V1 or less in step S94, the image 82B having the reference angle of view is also displayed for the image from the camera unit 13.

On the other hand, if it is determined in step S94 that the forward speed is higher than V1, the processing proceeds to step S96, and the image of the display region 83 having a narrow angle of view shown in FIG. 10B is displayed on the first display unit 50 as an electronic rearview mirror, and then the processing proceeds to step S101. The display region 83 is wider on an upper side and narrower in a left-right direction than the display region 82 of the reference angle of view. At this time, since distortion-correction is not performed for the entire image on an inner side of the display region 82 of the reference angle of view, delay in the image display due to the distortion-correction does not occur.

Therefore, an obstacle can be visually recognized quickly. Also, the recognition units 31b to 34b perform image recognition for the image recognition region 831, and the recognition unit 41b performs image recognition for the entire display region 83 having a narrow angle of view. The image recognition region 831 is set wider on an upper side and narrower on the left and right sides than the image recognition region 821. This is because, if the forward speed is high, there is a high likelihood of an obstacle or the like coming from an upper side of the screen, and a likelihood thereof from left and right sides will decrease.

Figure 11B:
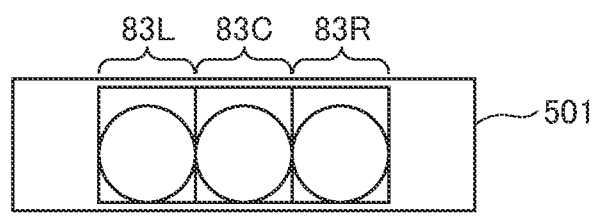

An image 83L of a narrow angle of view of the camera unit 14 on the left side, an image 83C of a narrow angle of view of the camera unit 11 on the front side, and an image 83R of a narrow angle of view of the camera unit 12 on the right side are displayed to be aligned as in FIG. 11B. As described above, if the forward speed is higher than V1 (for example, 60 km), a visual sense is narrowed, and thus displaying as in FIG. 11B makes it easier to quickly visually recognize necessary information.

Also, if it is determined in step S93 of FIG. 9 that the course is being changed, the processing proceeds to step S97 in which the image of the display region 84 having a wide angle of view on left and right sides as shown in FIG. 10 C is displayed. Here, the display region 84 has a width that is larger in the left-right direction than the display region 82 of the reference angle of view and extends downward therefrom.

Also, at this time, distortion-correction is not performed for an image in the high-resolution region (low-distortion region) 10a, and distortion-correction is performed on a region on an inner side of the display region 84 and on an outer side of the high-resolution region (low-distortion region) 10a. Since the forward speed is not so high while the course is being changed, such distortion-correction is performed. Further, the recognition units 31b to 34b perform image recognition on the image recognition region 841. On the other hand, the recognition unit 41b performs image recognition for the entire display region 84 having the wide angle of view.

The image recognition region 841 is set narrower vertically and wider on the left and right sides than the image recognition region 821. This is because the forward speed is low while the course is being changed, and there is a high likelihood that an obstacle is present in the left-right direction rather than the vertical direction of the screen.

Figure 11C:
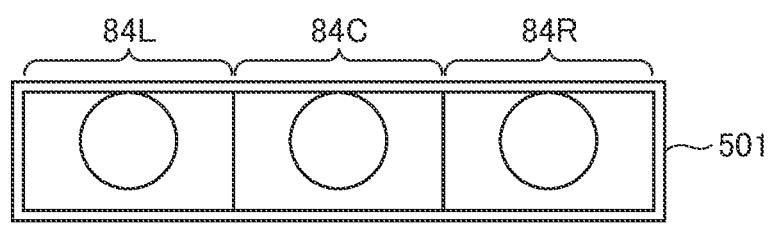

Then, an image 84L of a wide angle of view of the camera unit 14 on the left side, an image 84C of a wide angle of view of the camera unit 11 on the front side, and an image 84R of a wide angle of view of the camera unit 12 on the right side are displayed to be aligned on the display screen 501 of the first display unit 50 as shown in FIG. 11C.

Further, in FIGS. 11A to 11C, if there is an overlap region in a part of the images of the three reference angles of view, they may be displayed to be joined together and synthesized as a panoramic image.

Further, for example, if the course is being changed to the left, the three images displayed to be aligned as in FIG. 11C may be displayed to be shifted to the left with respect to a center of the display screen 501. Conversely, if the course is being changed to the right, the three images displayed to be aligned as in FIG. 11C may be displayed to be shifted to the right with respect to the center of the display screen 501. Visibility can be improved by displaying in such a manner.

In this way, in the third embodiment, since the image with a wide angle of view is displayed while the course is being changed, it becomes easier to visually recognize safety of the surroundings. Moreover, since the image in which the angle of view is extended downward is displayed, it becomes easier to visually recognize an obstacle on a road. After step S97, the processing proceeds to step S101.

Further, in FIGS. 11A to 11C, the images from the camera units 11, 12, and 14 are displayed to be aligned or synthesized, but for example, the images from the camera units 12, 13, and 14 may be displayed to be aligned or synthesized.

Figure 11D:
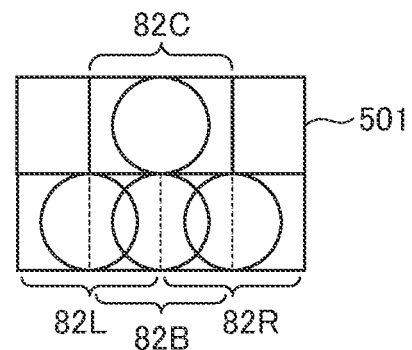

For example, FIG. 11D is a diagram showing a display example in which the images 82R, 82B, and 82L of the reference region from the camera units 12, 13, and 14 are displayed to be synthesized, and the image 82C of the reference region from the camera unit 11 is displayed on an upper side of the synthesized image. Further, these images are displayed on the display screen 501 of the first display unit 50 in FIG. 11D, but they may be displayed on the display screen 511 of the second display unit 51.

In step S92 of FIG. 9, if it is determined that the vehicle is not moving forward, the processing proceeds to step S98, and it is determined whether or not a reverse speed is higher than a predetermined speed V2 (for example, 10 km). If it is determined to be No, the processing proceeds to step S99, and an image 85B of the display region 85 for backward movement having a narrow angle of view in the vertical direction as shown in FIG. 10D is displayed on the display screen 511 of the second display unit 51, for example, as in FIG. 12B. Thereafter that, the processing proceeds to step S101.

Also, at this time, distortion-correction is not performed for an image in the high-resolution region (low-distortion region) 10a, and distortion-correction is performed on a region on an inner side of the display region 85 and on an outer side of the high-resolution region (low-distortion region) 10a. Since the reverse speed is generally low during backward movement, such distortion-correction is performed. Further, the recognition unit 33b of the camera unit 13 on the rear side performs image recognition on the image recognition region 851. On the other hand, the recognition unit 41b performs image recognition for the entire display region 85.

The image recognition region 851 is set narrower vertically and narrower also on the left and right sides than the image recognition region 821. This is because, since the reverse speed is low during backward movement, there is little need for quick image recognition over a wide range. Therefore, in this case, image recognition by the recognition unit 33b may not be performed.

Figure 13A:
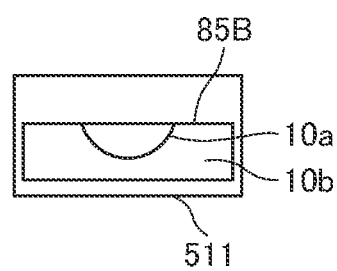
FIG. 13A is a diagram for explaining a display example of an image 85B having a narrow angle of view in a vertical direction at the time of moving backward in the third embodiment.

FIG. 12B shows an example of a screen displayed on the display screen 511 of the second display unit 51 when the vehicle 1 moves backward, and for example, a guide 512 for guiding the vehicle 1 in a parking space is displayed to be superimposed. FIG. 13A is a diagram for explaining a display example of the image 85B having a narrow angle of view in the vertical direction when the vehicle 1 moves backward in the third embodiment, and the image 85B having the narrow angle of view in the vertical direction is displayed on the display screen 511 of the second display unit 51, for example, as in FIG. 13A.

Figure 13B:
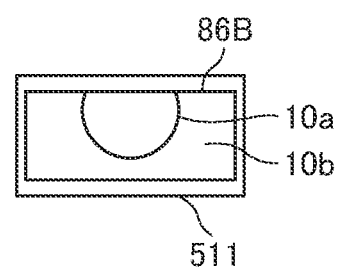
FIG. 13B is a diagram showing a display example of an image 86B having a wide angle of view for backward movement in the third embodiment.

On the other hand, if it is determined in step S98 that the reverse speed is higher than V2, the processing proceeds to step S100, and an image 86B of the display region 86 for backward movement having a wide angle of view in the vertical direction as shown in FIG. 10E is displayed on the display screen 511 of the second display unit 51 as shown in FIG. 13B. Thereafter, the processing proceeds to step S101. In step S101, it is determined whether or not there has been an end request from the user, and if it is determined as Yes, the flow of FIG. 9 ends, and if it is determined as No, the processing returns to step S91.

Also, at this time, distortion-correction is not performed for an image in the high-resolution region (low-distortion region) 10a, and distortion-correction is performed on a region on an inner side of the display region 86 and on an outer side of the high-resolution region (low-distortion region) 10a. Since the reverse speed is generally not so high during backward movement, such distortion-correction is performed. Further, the recognition unit 33b of the camera unit 13 on the rear side performs image recognition on the image recognition region 861. On the other hand, the recognition unit 41*b* performs image recognition for the entire display region 86.

The image recognition region 861 is set wider vertically and wider also on the left and right sides than the image recognition region 851. This is because, if the reverse speed is high even during backward movement, it is preferable to perform image recognition quickly for a wider range than the image recognition region 851. Here, FIG. 13B is a diagram showing a display example of the image 86B for backward movement having a wide angle of view in the third embodiment.

As shown in FIG. 10E, the display region 86 for backward movement having a wide angle of view has an angle of view extended further in the vertical direction than that of the display region 85 for backward movement having a narrow angle of view. This is for displaying a place further to the rear to make it easier to visually recognize an obstacle when the reverse speed is higher than V2. Further, a left-right width of the display region 86 for backward movement having a wide angle of view and a left-right width of the display region 85 for backward movement having a narrow angle of view are the same in the third embodiment, but the left-right width of the display region 86 may be smaller than the left-right width of the display region 85.

Further, for example, in FIGS. 10A, 10C, 10D, and 10E, distortion-correction is not performed for the high-resolution region 10*a* in the image display region, distortion-correction is performed for a region other than the high-resolution region 10*a* in the image display region. However, the region on which the distortion-correction is not performed may be, for example, a rectangular region on an inner side of the high-resolution region 10*a*. Alternatively, the region on which the distortion-correction is not performed may be, for example, a rectangular region larger than the high-resolution region 10*a* including the high-resolution region 10*a*.

As described above, in the third embodiment, since the distortion-correction region and the display region can be appropriately changed according to a moving state of the vehicle 1 as the mobile object, it is possible to further bring out performance of the image processing system that uses the optical system such as a different-angle-of-view lens. Further, since the image recognition region is also changed according to a moving state of the vehicle 1 as the mobile object, the performance of the image processing system can be further brought out.

As described above, in the first to third embodiments, the high-resolution region (low-distortion region) 10*a* is configured to have a projection characteristic that is approximate to that of a central projection method (y=f×tan θ) or an equidistant projection method (y=f×θ) of a normal optical system for imaging as described above. Therefore, for example, the image of the high-resolution region (low-distortion region) 10*a* displayed on the first display unit 50 or the second display unit 51 has a resolution higher than that of the low-resolution region (high-distortion region) 10*b*, and a front side, a lateral side, and a distant place to the rear of the vehicle 1 can be displayed more finely.

Also, since the high-resolution region 10*a* has a small optical distortion, the image for the electronic rearview mirror displayed on the first display unit 50 can also be displayed in a state in which the distortion is small, and the driver can visually recognize surroundings of the vehicle with a more natural perspective.

Also, since the high-resolution region 10*a* in the embodiment is configured to reduce the optical distortion and image recognition can be performed in a state of a RAW image signal without distortion-correction, a processing load for image recognition can be reduced and image recognition can be performed at high speed. Therefore, an obstacle can be found at an early stage on the basis of the image recognition result, and an action for avoiding the obstacle can be performed in a timely manner. As described above, if the configuration of the third embodiment is used, a great effect can be obtained particularly at the time of high-speed traveling on a highway or the like.

Also, since the distortion-correction region is configured to be changed as appropriate, an obstacle or the like can be quickly ascertained according to a moving state of the mobile object or the surrounding conditions, and performance of the optical system such as a different-angle-of-view lens can be brought out to the maximum.

Also, in the above embodiment, an example of selecting whether to perform distortion-correction or not has been described, but if distortion-correction is not performed, a case in which a distortion-correction factor is lower than a predetermined value X1 is included. Also, a case of performing the distortion-correction includes a case in which the distortion-correction factor is higher than a predetermined value X2 (however, X2 is X1 or more), and X1 may be set to, for example, 10% and X2 may be set to, for example, 90%. Also, it is not limited to selecting two types of distortion-correction factors, and it may be configured such that the distortion-correction factor can be gradually changed. The embodiments of the present invention include such ones.

Further, in the above embodiment, an example in which a plurality of camera units are used has been described, but it is also effective in a system having only one camera unit. Further, a boundary image for showing a boundary between a region for distortion-correction and a region without distortion-correction may be made possible to be displayed, for example, during normal traveling.

Particularly, if a luminance level difference is noticeable due to an image shift at the boundary portion due to a presence or absence of distortion-correction or a difference in exposure timing between the distortion-correction region and the non-distortion-correction region, a boundary image as described above may be displayed to reduce a sense of discomfort. In that case, a line width, a concentration, a color, or the like of the boundary image may also be changed to reduce a sense of discomfort between the distortion-correction region and the non-distortion-correction region.

Also, it may be configured such that the distortion-correction factor in the distortion-correction region is adjusted according to a size and shape of the boundary image to smoothly connect images of a stationary object in the distortion-correction region and the non-distortion-correction region.

Also, the boundary image may be displayed if the user sets a region without distortion-correction in advance other than during normal traveling, or in adjusting a posture of each camera unit. Thereby, the boundary between the distortion-correction region and the non-distortion-correction region becomes clear, and adjustment work can be made more efficient.

Further, in the above-described embodiment, an example in which an image processing system is mounted on the mobile object such as a vehicle has been described. However, the mobile object of these embodiments is not limited to a vehicle such as an automobile, and may be any moving device such as a train, a ship, an airplane, a robot, or a drone.

Also, the image processing system of the embodiment may or may not be mounted on those moving bodies. Also, configurations of these embodiments can be applied to, for example, a case in which the mobile object is controlled remotely.

Fourth Embodiment

At least one of the various functions, processes, and methods described in the first to third embodiments described above can be realized using a program. Hereinafter, in a fourth embodiment, a program for realizing at least one of the various functions, processes, and methods described in the first embodiment described above is referred to as "Program X."

Further, in the fourth embodiment, a computer for executing the program X is called "computer Y" A personal computer, a microprocessor, a central processing unit (CPU), and the like are examples of the computer Y A computer such as the image processing system in the above-described embodiment is also an example of the computer Y.

At least one of the various functions, processes, and methods described in the first to third embodiments described above can be realized by the computer Y executing the program X. In this case, the program X is supplied to the computer Y via a computer-readable storage medium.

The computer-readable storage medium in the fourth embodiment includes at least one of a hard disk device, a magnetic storage device, an optical storage device, a magneto-optical storage device, a memory card, a ROM, a RAM, and the like. Further, the computer-readable storage medium in the fourth embodiment is of a non-transitory storage medium.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

This application claims the benefit of Japanese Patent Application No. 2021-155137 filed on Sep. 24, 2021, which is hereby incorporated by reference herein in its entirety.

What is claimed is:

1. An image processing system comprising:
   at least one processor or circuit configured to function as a plurality of units comprising:
   (1) an image acquisition unit configured to acquire an image signal generated by an imaging device that captures an optical image having a low-distortion region and a high-distortion region;
   (2) a setting unit configured to set a distortion-correction region on which distortion-correction is performed for the image signal and a non-distortion-correction region on which distortion-correction is not performed for the image signal on the basis of characteristics of the optical image; and
   (3) a display signal generation unit configured to perform distortion-correction for the image signal of the distortion-correction region on the basis of the characteristics of the optical image, and to generate a synthesized image by synthesizing the image signal on which distortion-correction has been performed and the image signal of the non-distortion-correction region,
   wherein the setting unit is able to set (1) a state in which an entire screen is set as the distortion-correction region and (2) a state in which an entire screen is set as the non-distortion-correction region.

2. The image processing system according to claim 1, wherein the setting unit comprises a UI for setting the distortion-correction region or the non-distortion-correction region by a user.

3. The image processing system according to claim 1, further comprising at least one processor or circuit configured to function as a characteristics information holding unit configured to hold characteristic information on the characteristics of the optical image, and
   wherein the display signal generation unit performs the distortion-correction on the basis of the characteristic information of the optical image held by the characteristics information holding unit.

4. The image processing system according to claim 1, wherein the imaging device is installed in a mobile object, and
   wherein the setting unit sets the distortion-correction region and the non-distortion-correction region according to a moving state of the mobile object.

5. The image processing system according to claim 1, further comprising at least one processor or circuit configured to function as a first image recognition unit configured to perform image recognition on the basis of the image signal, and
   wherein the setting unit sets the distortion-correction region and the non-distortion-correction region on the basis of a result of image recognition by the first image recognition unit.

6. The image processing system according to claim 5, wherein the first image recognition unit performs image recognition on the basis of an image on which distortion-correction has not been performed.

7. The image processing system according to claim 6, further comprising at least one processor or circuit configured to function as a second image recognition unit configured to perform image recognition on the basis of the synthesized image.

8. The image processing system according to claim 5, wherein the imaging device is installed on a mobile object, and
   wherein the first image recognition unit changes an image recognition region according to a moving state of the mobile object.

9. The image processing system according to claim 1, wherein the low-distortion region and the high-distortion region respectively correspond to a high-resolution region and a low-resolution region of the optical image.

10. An image processing system comprising:
    at least one processor or circuit configured to function as a plurality of units comprising:
    (1) an image acquisition unit configured to acquire an image signal generated by an imaging device that captures an optical image having a low-distortion region and a high-distortion region;
    (2) a setting unit configured to set a distortion-correction region on which distortion-correction is performed for the image signal and a non-distortion-correction region on which distortion-correction is not performed for the image signal on the basis of characteristics of the optical image; and
    (3) a display signal generation unit configured to perform distortion-correction for the image signal of the distortion-correction region on the basis of the characteristics of the optical image, and to generate a synthesized image by synthesizing the image signal on which distortion-correction has been performed and the image signal of the non-distortion-correction region, wherein the image acquisition unit includes (1) an optical system that forms the optical image, and (2) an imaging element that captures the optical image formed by the optical system, and wherein, when a focal length of the optical system is f, a half angle of view is θ, an image height on an imaging plane is y, and a projection characteristic representing a relationship between the image height y and the half angle of view θ is y(θ), y(θ) in the low-distortion region is larger than f×θ, and is different from the projection characteristic in the high-distortion region.

11. The image processing system according to claim 10, wherein the low-distortion region has a projection characteristic which is approximate to that of a central projection method (y=f×tan θ) or an equidistant projection method (y=f×θ).

12. The image processing system according to claim 10, wherein, when θmax is a maximum half angle of view of the optical system and A is a predetermined constant, the image processing system is configured to satisfy $$1 < \frac{f \times \sin\theta_{max}}{y(\theta_{max})} \leq A.$$

13. An image processing system comprising:
at least one processor or circuit configured to function as a plurality of units comprising:

(1) an image acquisition unit configured to acquire an image signal generated by an imaging device that captures an optical image having a low-distortion region and a high-distortion region;
(2) a setting unit configured to set a distortion-correction region on which distortion-correction is performed for the image signal and a non-distortion-correction region on which distortion-correction is not performed for the image signal on the basis of characteristics of the optical image; and
(3) a display signal generation unit configured to perform distortion-correction for the image signal of the distortion-correction region on the basis of the characteristics of the optical image, and to generate a synthesized image by synthesizing the image signal on which distortion-correction has been performed and the image signal of the non-distortion-correction region, wherein the image acquisition unit includes a plurality of the imaging devices disposed at different positions, wherein the display signal generation unit synthesizes the image signals acquired from the plurality of the imaging devices to generate a synthesized image, wherein imaging ranges of at least two imaging devices of the plurality of imaging devices are disposed to overlap each other, and wherein the imaging ranges of the low-distortion regions of at least two imaging devices of the plurality of imaging devices are disposed to overlap each other.

* * * * *